United States Patent
Husain

(10) Patent No.: US 12,405,125 B2
(45) Date of Patent: Sep. 2, 2025

(54) IMAGE-BASED NAVIGATION

(71) Applicant: SparkCognition, Inc., Austin, TX (US)

(72) Inventor: Syed Mohammad Amir Husain, Georgetown, TX (US)

(73) Assignee: AVATHON, INC., Austin, TX (US)

( * ) Notice: Subject to any disclaimer, the term of this patent is extended or adjusted under 35 U.S.C. 154(b) by 140 days.

(21) Appl. No.: 18/487,679

(22) Filed: Oct. 16, 2023

(65) Prior Publication Data

US 2024/0125609 A1 Apr. 18, 2024

Related U.S. Application Data

(60) Provisional application No. 63/379,933, filed on Oct. 18, 2022.

(51) Int. Cl.
*G01C 21/36* (2006.01)
*G10L 15/26* (2006.01)

(52) U.S. Cl.
CPC ..... *G01C 21/3602* (2013.01); *G01C 21/3608* (2013.01); *G01C 21/3647* (2013.01); *G10L 15/26* (2013.01)

(58) Field of Classification Search
CPC ............ G01C 21/3602; G01C 21/3608; G01C 21/3647; G10L 15/26
See application file for complete search history.

(56) References Cited

U.S. PATENT DOCUMENTS

| | | | |
|---|---|---|---|
| 11,644,330 B2* | 5/2023 | Hubbell | G01C 21/362 |
| | | | 701/410 |
| 11,893,815 B2* | 2/2024 | Balakrishnan | G06N 20/00 |
| 2010/0220870 A1* | 9/2010 | Leda | G01C 21/3688 |
| | | | 381/86 |
| 2011/0035137 A1* | 2/2011 | Konishi | F02N 11/0818 |
| | | | 701/115 |
| 2014/0114573 A1* | 4/2014 | Ettinger | G01C 21/3641 |
| | | | 701/533 |
| 2014/0250120 A1 | 9/2014 | Mei et al. | |
| 2018/0267994 A1* | 9/2018 | Badr | G06V 10/768 |
| 2020/0250227 A1* | 8/2020 | Badr | G06F 16/5866 |
| 2021/0072033 A1 | 3/2021 | Husain | |
| 2021/0172753 A1* | 6/2021 | Johnson, Jr. | G01C 21/343 |
| 2022/0011129 A1 | 1/2022 | Hubbell et al. | |
| 2023/0126412 A1* | 4/2023 | Balakrishnan | G06F 16/332 |
| | | | 382/177 |

* cited by examiner

*Primary Examiner* — Hussein Elchanti
(74) *Attorney, Agent, or Firm* — Moore IP Law

(57) ABSTRACT

A method includes receiving, at one or more processors of a vehicle, user speech input, the user speech input including a navigation command and a description of a photograph. The method also includes transmitting, via a local network, query data based on the user speech input to a portable computing device associated with the vehicle to initiate an image search based on the user speech input. The method further includes receiving, at the one or more processors of the vehicle from the portable computing device via the local network, location data indicating a location associated with the photograph and setting, by the one or more processors of the vehicle, a navigation waypoint based on the location data and based on the navigation command.

20 Claims, 5 Drawing Sheets

IMAGE-BASED NAVIGATION

CROSS-REFERENCE TO RELATED APPLICATION

The present application claims priority from U.S. Provisional Application No. 63/379,933 filed Oct. 18, 2022, entitled "IMAGE-BASED NAVIGATION," which is incorporated by reference herein in its entirety.

BACKGROUND

In recent years, computing devices have become more common. For example, modern vehicles, such as automobiles, trucks, aircraft, and boats, often include integrated computing devices that support various operations of the vehicle. To illustrate, there are ongoing efforts to make certain types of vehicles operate autonomously using onboard computing devices. Still other computing devices are onboard vehicles to improve the user experience of operating the vehicle.

In addition to vehicle-based computing devices, portable computing devices and so-called "cloud-based" services (generally supported by server computing devices and/or distributed computing systems) are also increasingly common. For example, personal computing devices, such as smart phones, are so common that, in many areas of the world, it is somewhat unusual for an individual not to have one at hand.

Some research has tended to indicate that reliance on such computing devices may decrease human mental self-reliance. For example, some research indicates that people's ability to remember or recall certain types of information may decrease due to constant or frequent use of personal computing devices. Such recall difficulties can make it difficult to take full advantage of some types of computing operations. To illustrate, while a user may have access to a navigation-enabled computing device while operating a vehicle, the user may not be able to recall a name or address of the location to which the user wishes to travel. As a result, the user may be unable to instruct the navigation-enabled computing device sufficiently to uniquely identify the location.

SUMMARY

The present disclosure describes systems and methods that enable image-based navigation. For example, a user can provide speech input that describes a photograph of a target location. One or more computing devices can use machine-learning models (e.g., natural-language processing models and image matching models) and search techniques (e.g., image-based search engines) to identify a location described by the user. The computing device(s) can generate navigation data to assist the user with navigation to the target location.

In some aspects, a vehicle includes one or more memory devices storing instructions and one or more processors configured to execute the instructions. Execution of the instructions causes the one or more processors to receive user speech input, the user speech input including a navigation command and a description of a photograph. Execution of the instructions further causes the one or more processors to cause query data based on the user speech input to be transmitted via a network to a portable computing device to initiate an image search based on the user speech input. Execution of the instructions also causes the one or more processors to receive, from the portable computing device via the local network, location data indicating a location associated with the photograph. Execution of the instructions further causes the one or more processors to set a navigation waypoint based on the location data and based on the navigation command.

In some aspects, a method includes receiving user speech input, at one or more processors of a vehicle, the user speech input including a navigation command and a description of a photograph. The method also includes transmitting, via a network, query data that is based on the user speech input to a portable computing device associated with the vehicle to initiate an image search based on the user speech input. The method further includes receiving location data at the one or more processors of the vehicle from the portable computing device via the local network, the location data indicating a location associated with the photograph. The method also includes setting, by the one or more processors of the vehicle, a navigation waypoint based on the location data and based on the navigation command.

In some aspects, a non-transitory computer-readable device stores instructions that are executable by one or more processors to cause the one or more processors to receive user speech input, the user speech input including a navigation command and a description of a photograph. The instructions are further executable to transmit query data that is based on the user speech input to another computing device to initiate an image search based on the user speech input. The instructions are further executable to receive, from the other computing device, location data indicating a location associated with the photograph. The instructions are further executable to set a navigation waypoint based on the location data and based on the navigation command.

In some aspects, a computing device includes one or more memory devices storing instructions and one or more processors configured to execute the instructions. Execution of the instructions causes the one or more processors to receive, via a network, query data based on user speech input that includes a navigation command and a description of a photograph. Execution of the instructions further causes the one or more processors to initiate an image search based on the description of the photograph. Execution of the instructions also causes the one or more processors to determine, based on the image search, location data indicating a location associated with the photograph. Execution of the instructions further causes the one or more processors to send, via the network, a navigation waypoint based on the location data and based on the navigation command.

DETAILED DESCRIPTION

Figure 1:
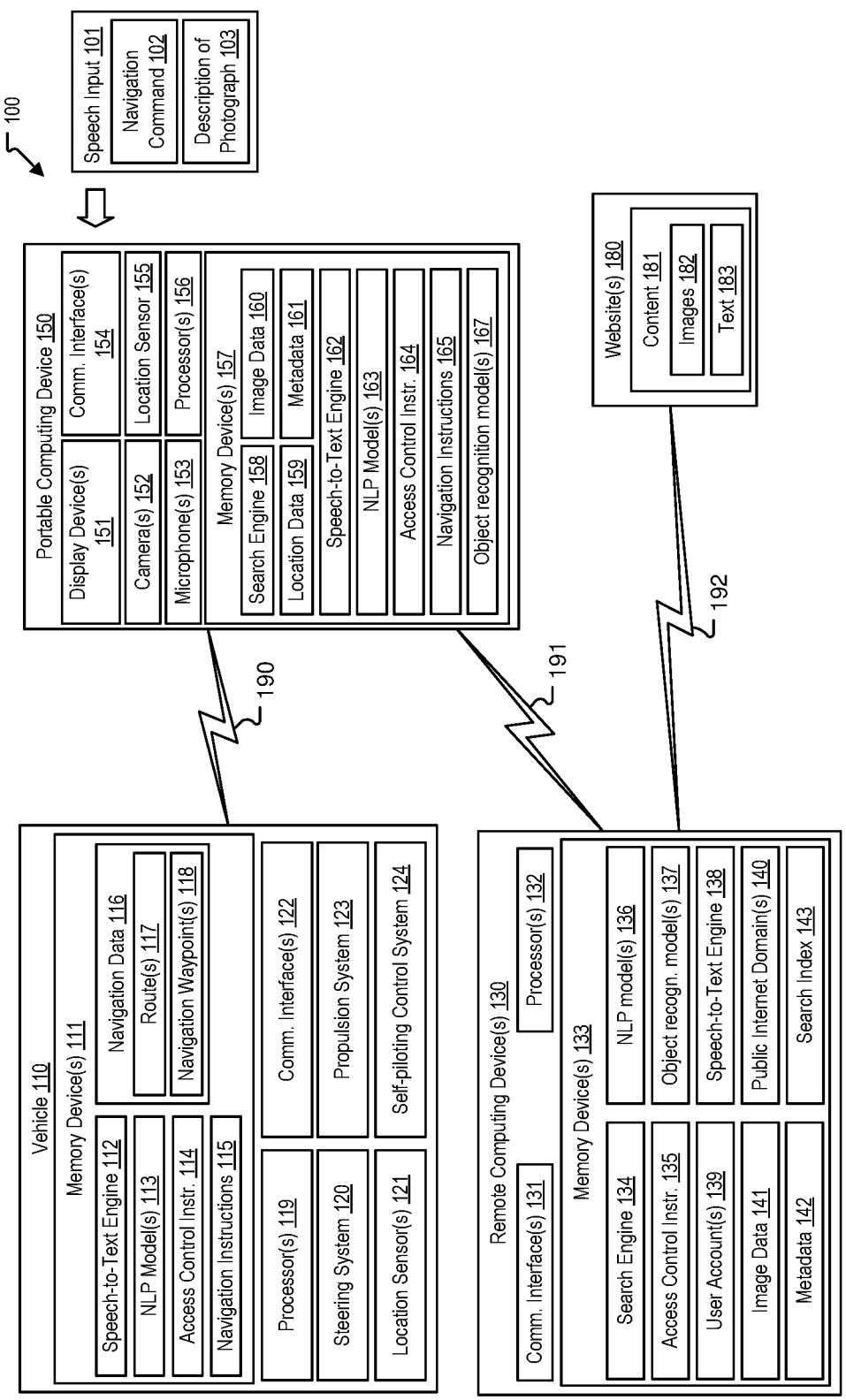
FIG. 1 is a block diagram illustrating a particular implementation of a system that is operable to perform aspects of image-based navigation in accordance with some examples of the present disclosure.

Particular aspects of the present disclosure are described below with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple instances of query data are illustrated and associated with reference numbers 206A and 206B. When referring to a particular one of these instances of query data, such as the query data 206A, the distinguishing letter "A" is used. However, when referring to any arbitrary one of these instances of query data or to these instances of query data as a group, the reference number 206 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further the terms "comprise," "comprises," and "comprising" may be used interchangeably with "include," "includes," or "including." Additionally, the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. Such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, the term "machine learning" should be understood to have any of its usual and customary meanings within the fields of computer science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so-called "transfer learning." As described further below, in transfer learning a base model may be trained using a generic or typical data set, and the base model may be subsequently refined (e.g., re-trained or further trained) using a more specific data set.

A data set used during training is referred to as a "training data set" or simply "training data." The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Machine-learning models can be initialized from scratch (e.g., by a user, such as a data scientist) or using a guided process (e.g., using a template or previously built model). Initializing the model includes specifying parameters and hyperparameters of the model. "Hyperparameters" are characteristics of a model that are not modified during training, and "parameters" of the model are characteristics of the model that are modified during training. The term "hyperparameters" may also be used to refer to parameters of the training process itself, such as a learning rate of the training process. In some examples, the hyperparameters of the model are specified based on the task the model is being created for, such as the type of data the model is to use, the goal of the model (e.g., classification, regression, anomaly detection), etc. The hyperparameters may also be specified based on other design goals associated with the model, such as a memory footprint limit, where and when the model is to be used, etc.

Model type and model architecture of a model illustrate a distinction between model generation and model training. The model type of a model, the model architecture of the model, or both, can be specified by a user or can be automatically determined by a computing device. However, neither the model type nor the model architecture of a particular model is changed during training of the particular model. Thus, the model type and model architecture are hyperparameters of the model and specifying the model type and model architecture is an aspect of model generation (rather than an aspect of model training). In this context, a "model type" refers to the specific type or sub-type of the machine-learning model. As noted above, examples of machine-learning model types include, without limitation, perceptrons, neural networks, support vector machines, regression models, decision trees, Bayesian models, Boltzmann machines, adaptive neuro-fuzzy inference systems, as well as combinations, ensembles and variants of these and other types of models. In this context, "model architecture" (or simply "architecture") refers to the number and arrangement of model components, such as nodes or layers, of a model, and which model components provide data to or receive data from other model components. As a non-limiting example, the architecture of a neural network may be specified in terms of nodes and links. To illustrate, a neural network architecture may specify the number of nodes in an input layer of the neural network, the number of hidden layers of the neural network, the number of nodes in each hidden layer, the number of nodes of an output layer, and which nodes are connected to other nodes (e.g., to provide input or receive output). As another non-limiting example, the architecture of a neural network may be specified in terms of layers. To illustrate, the neural network architecture may specify the number and arrangement of specific types of functional layers, such as long-short-term memory (LSTM) layers, fully connected (FC) layers, convolution layers, etc. While the architecture of a neural network implicitly or explicitly describes links between nodes or layers, the architecture does not specify link weights. Rather, link weights are parameters of a model (rather than hyperparameters of the model) and are modified during training of the model.

In many implementations, a data scientist selects the model type before training begins. However, in some implementations, a user may specify one or more goals (e.g., classification or regression), and automated tools may select one or more model types that are compatible with the specified goal(s). In such implementations, more than one model type may be selected, and one or more models of each selected model type can be generated and trained. A best performing model (based on specified criteria) can be selected from among the models representing the various model types. Note that in this process, no particular model type is specified in advance by the user, yet the models are trained according to their respective model types. Thus, the model type of any particular model does not change during training.

Similarly, in some implementations, the model architecture is specified in advance (e.g., by a data scientist); whereas in other implementations, a process that both generates and trains a model is used. Generating (or generating and training) the model using one or more machine-learning techniques is referred to herein as "automated model building". In one example of automated model building, an initial set of candidate models is selected or generated, and then one or more of the candidate models are trained and evaluated. In some implementations, after one or more rounds of changing hyperparameters and/or parameters of the candidate model(s), one or more of the candidate models may be selected for deployment (e.g., for use in a runtime phase).

Certain aspects of an automated model building process may be defined in advance (e.g., based on user settings, default values, or heuristic analysis of a training data set) and other aspects of the automated model building process may be determined using a randomized process. For example, the architectures of one or more models of the initial set of models can be determined randomly within predefined limits. As another example, a termination condition may be specified by the user or based on configurations settings. The termination condition indicates when the automated model building process should stop. To illustrate, a termination condition may indicate a maximum number of iterations of the automated model building process, in which case the automated model building process stops when an iteration counter reaches a specified value. As another illustrative example, a termination condition may indicate that the automated model building process should stop when a reliability metric associated with a particular model satisfies a threshold. As yet another illustrative example, a termination condition may indicate that the automated model building process should stop if a metric that indicates improvement of one or more models over time (e.g., between iterations) satisfies a threshold. In some implementations, multiple termination conditions, such as an iteration count condition, a time limit condition, and a rate of improvement condition can be specified, and the automated model building process can stop when one or more of these conditions is satisfied.

Another example of training a previously generated model is transfer learning. "Transfer learning" refers to initializing a model for a particular data set using a model that was trained using a different data set. For example, a "general purpose" model can be trained to detect anomalies in vibration data associated with a variety of types of rotary equipment, and the general purpose model can be used as the starting point to train a model for one or more specific types of rotary equipment, such as a first model for generators and a second model for pumps. As another example, a general-purpose natural-language processing model can be trained using a large selection of natural-language text in one or more target languages. In this example, the general-purpose natural-language processing model can be used as a starting point to train one or more models for specific natural-language processing tasks, such as translation between two languages, question answering, or classifying the subject matter of documents. Often, transfer learning can converge to a useful model more quickly than building and training the model from scratch.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

As another example, to use supervised training to train a model to perform a classification task, each data element of a training data set may be labeled to indicate a category or categories to which the data element belongs. In this example, during the creation/training phase, data elements are input to the model being trained, and the model generates output indicating categories to which the model assigns the data elements. The category labels associated with the data elements are compared to the categories assigned by the model. The computer modifies the model until the model accurately and reliably (e.g., within some specified criteria) assigns the correct labels to the data elements. In this example, the model can subsequently be used (in a runtime phase) to receive unknown (e.g., unlabeled) data elements, and assign labels to the unknown data elements. In an unsupervised training scenario, the labels may be omitted. During the creation/training phase, model parameters may be tuned by the training algorithm in use such that during the runtime phase, the model is configured to determine which of multiple unlabeled "clusters" an input data sample is most likely to belong to.

As another example, to train a model to perform a regression task, during the creation/training phase, one or more data elements of the training data are input to the model being trained, and the model generates output indicating a predicted value of one or more other data elements of the training data. The predicted values of the training data are compared to corresponding actual values of the training data, and the computer modifies the model until the model accurately and reliably (e.g., within some specified criteria) predicts values of the training data. In this example, the model can subsequently be used (in a runtime phase) to receive data elements and predict values that have not been received. To illustrate, the model can analyze time series data, in which case, the model can predict one or more future values of the time series based on one or more prior values of the time series.

In some aspects, the output of a model can be subjected to further analysis operations to generate a desired result. To illustrate, in response to particular input data, a classification model (e.g., a model trained to perform classification tasks) may generate output including an array of classification scores, such as one score per classification category that the model is trained to assign. Each score is indicative of a likelihood (based on the model's analysis) that the particular input data should be assigned to the respective category. In this illustrative example, the output of the model may be subjected to a softmax operation to convert the output to a probability distribution indicating, for each category label, a probability that the input data should be assigned the corresponding label. In some implementations, the probability distribution may be further processed to generate a one-hot encoded array. In other examples, other operations that retain one or more category labels and a likelihood value associated with each of the one or more category labels can be used.

FIG. 1 is a block diagram illustrating a particular implementation of a system 100 that is operable to perform aspects of image-based navigation in accordance with some examples of the present disclosure. In FIG. 1, the system 100 includes a vehicle 110, a portable computing device 150, and one or more remote computing devices 130. In FIG. 1, the vehicle 110 is communicatively coupled to the portable computing device 150 via a first network connection 190, the portable computing device 150 is communicatively coupled to the remote computing device(s) 130 via one or more second network connections 191, and the remote computing device(s) 130 are communicatively coupled to one or more website(s) 180 via one or more third network connections 192. In some implementations, the remote computing device(s) 130 include (e.g., host) or provide access to one or more websites 180.

In other examples, the system omits the remote computing device(s) 130, the website(s) 180, or a combination thereof. The system 100 is configured to use a description of a photograph 103 provided via speech input 101 from a user to perform an image-based search. When the speech input 101 includes a navigation command 102 in addition to the description of a photograph 103, a location associated with an image that matches the image-based search is used to set a navigation waypoint 118 for navigation of the vehicle 110 to the location associated with the matching image. The navigation command 102 indicates how the user wants the system 100 to use the location associated with the image. For example, if the navigation command 102 is "take me to" the location, the navigation command 102 instructs the vehicle 110 to automatically navigate to the location. As another example, if the navigation command 102 is "how do I get to" the location, the navigation command 102 instructs the vehicle 110 or the portable computing device 150 to display navigation information (e.g., a map or turn-by-turn instructions) associated with the location. The description of the photograph 103 includes, for example, a description of at least one of a person, an object, or a landmark depicted in the photograph. In another example, the description of the photograph 103 includes one or more context descriptors, such as descriptions of an event at which the photograph was captured (e.g., "Billy's birthday party"), a description of colors of particular objects (e.g., "a red door"), a description of a time at which the photograph was captured (e.g., "at night" or "last Thursday"), etc.

In the example illustrated in FIG. 1, the vehicle 110 includes one or more memory devices 111, one or more processors 119, one or more communication interfaces 122, a steering system 120, a propulsion system 123, one or more location sensors 121, and a self-piloting control system 124. In other implementations, the vehicle 110 includes more, fewer, or different components. For example, in some implementations, the vehicle 110 includes one or more cameras to capture images of an area around the vehicle 110. As another example, in some implementations, the self-piloting control system 124 is omitted.

In the example illustrated in FIG. 1, the memory device(s) 111 store data and instructions that are executable by the processor(s) 119 to perform various operations and functions. For example, in FIG. 1, the memory device(s) 111 include a speech-to-text engine 112 that is executable by the processor(s) 119 to generate text representing the speech input 101. In FIG. 1, the memory device(s) 111 also include one or more natural language processing (NLP) models 113 that are executable by the processor(s) 119 to enable a computing device (e.g., the processor(s) 119 of the vehicle 110, the portable computing device 150, or the remote computing device(s) 130) to perform various operations based on unstructured, natural language content (such as the speech input 101 or text representing the speech input 101). The speech-to-text engine 112, the NLP model(s) 113, or both, may include or correspond to one or more trained machine-learning models.

In the example illustrated in FIG. 1, the memory device(s) 111 also include access control instructions 114. The access control instructions 114 are executable by the processor(s) 119 to control access to particular functions of the vehicle 110. For example, the access control instructions 114 may be executable to determine whether a user that uttered the speech input 101 is authorized to provide navigation commands (e.g., the navigation command 102) to the vehicle 110. In this example, if the user is authorized to provide navigation commands to the vehicle 110, the navigation command 102 may cause navigation instructions 115 to perform specified actions; however, if the user is not authorized to provide navigation commands to the vehicle 110, the navigation command 102 may be rejected (e.g., discarded). In some implementations, the access control instructions 114 are executable to determine whether the portable computing device 150 (instead of the user or in addition to the user) is authorized to provide navigation commands (e.g., the navigation command 102) to the vehicle 110. In some implementations, the access control instructions 114 protect access to other functions of the vehicle 110 in addition to or instead of navigation of the vehicle 110. For example, in such implementations, the access control instructions 114 may limit which users or portable computing devices are allowed to retrieve location information from the location sensor(s) 121.

In a particular implementation, the access control instructions 114 determine whether a user is authorized based on comparison of features of the speech input 101 to features associated with one or more authorized users. In some implementations, the access control instructions 114 determine whether a user is authorized based on a command, keyword, password, passphrase, or other credential provided by the user (e.g., via the speech input or via another input mechanism, such as the communication interface(s) 122). In a particular implementation, the access control instructions 114 determine whether the portable computing device 150 is authorized based on credentials provided by the portable computing device 150, an electronic identifier (e.g., a media access control (MAC) identifier, or other identifier) of the portable computing device 150, etc.

In the example illustrated in FIG. 1, the memory device(s) 111 also includes the navigation instructions 115. The navigation instructions 115 are executable by the processor(s) 119 to generate navigation data 116, such as one or more routes 117 between two or more navigation waypoints 118. In some implementations, the navigation instructions 115 may also be executable to designate one or more of the navigation waypoint(s) 118. For example, the navigation instructions 115 may designate a current location of the vehicle 110, as indicated by the location sensor(s) 121, as a starting navigation waypoint for a route. In this example, another of the navigation waypoint(s) 118 may be selected based on a location associated with an image that matches the description of the photograph 103, as described further below. Additionally, or alternatively, the navigation instructions 115 may be executable by the processor(s) 119 to provide navigation commands based on one of the route(s) 117 to the self-piloting control system 124. For example, when the navigation command 102 indicates that the vehicle 110 should operate autonomously (e.g., automated vehicle control), the navigation instructions 115 may send turn-by-turn instructions to the self-piloting control system 124.

The communication interface(s) 122 include one or more input/output (I/O) devices (e.g., microphones, speakers, displays, etc.), one or more transceivers, one or more data ports, etc. For example, the communication interface(s) 122 may include wired or wireless network adaptors configured to support the one or more first network connections 190 between the vehicle 110 and the portable computing device 150. To illustrate, the first network connections 190 may include a wired network connection established via a universal serial bus connection between the communication interface(s) 122 of the vehicle 110 and communication interface(s) 154 of the portable computing device 150. As another illustrative example, the first network connections 190 may include a wireless network connection established via Bluetooth® communication connection between the vehicle 110 and communication interface(s) 154 of the portable computing device 150 (Bluetooth is a registered trademark of Bluetooth SIG, Inc., Washington). In other examples, the first network connections 190 may include other types of wireless peer-to-peer ad hoc network connections instead of or in addition to a Bluetooth® communication connection. In other examples, other types of wireless communications or other wireless communication protocols may be used.

The propulsion system 123 is configured to cause movement of the vehicle 110. For example, the propulsion system 123 may include one or more engines, one or more motors, or both, to supply torque to movement effectors, such as wheels, tracks, propellers, fans, or other devices. The propulsion system 123 may also include devices or components to transfer and/or regulate the torque provided to the movement effectors. To illustrate, the propulsion system 123 may include gears, transmission systems, clutches, etc.

The steering system 120 is configured to control a direction of movement of the vehicle 110. For example, the steering system 120 may include couplings to orient wheels, a rudder, aerodynamic control surfaces, or other devices to control a direction of movement of the vehicle 110.

The location sensor(s) 121 are configured to detect or estimate a current position of the vehicle 110 using triangulation, multilateration, dead reckoning, computer vision, or other location estimation techniques. As a specific example, the location sensor(s) 121 may include global position sensors configured to determine the current global position of the vehicle 110 based on signals from multiple satellites.

The self-piloting control system 124 is configured to perform operations associated with automated vehicle control, such as controlling the propulsion system 123, the steering system 120, or both, to cause the vehicle 110 to move autonomously or semi-autonomously along a particular route of the route(s) 117. In particular implementations, the self-piloting control system 124 includes sensors to provide local context information for collision avoidance, traffic management, and compliance with local laws and driving customs.

In the example illustrated in FIG. 1, the portable computing device 150 includes or corresponds to a personal computer (PC), a tablet PC, a personal digital assistant (PDA), a laptop computer, a communications device, a wireless telephone, a smart phone, a smart watch, a headset, or any similar portable device that includes one or more processors 156 configured to execute instructions from one or more memory devices 157.

In the example illustrated in FIG. 1, the portable computing device 150 includes the memory device(s) 157, the processor(s) 156, one or more display devices 151, one or more cameras 152, one or more microphones 153, one or more communication interfaces 154, and one or more location sensors 155. In other implementations, the portable computing device 150 includes more, fewer, or different components. For example, in some implementations, the portable computing device 150 includes a battery or other portable power supply to enable the portable computing device 150 to operate without a connection to an external power source.

The communication interface(s) 154 include one or more transceivers, one or more data ports, etc. For example, the communication interface(s) 154 may include wired or wireless network adaptors configured to support the one or more first network connections 190 between the vehicle 110 and the portable computing device 150 and configured to support the one or more second network connections 191 between the portable computing device 150 and the remote computing device(s) 130. To illustrate, the second network connections 191 may include a wide area wireless network connection, such as cellular data (or voice and data) network. Examples of wide area wireless network connection include, without limitation, connections over networks that conform to any 3GPP specification, such as so called fifth generation (5G) networks, fourth generation (4G) networks, third generation (3G) networks, etc.

In the example illustrated in FIG. 1, the memory device(s) 157 store data and instructions that are executable by the processor(s) 156 to perform various operations and functions. For example, in FIG. 1, the memory device(s) 157 include a speech-to-text engine 162 that is executable by the processor(s) 156 to generate text representing the speech input 101. In FIG. 1, the memory device(s) 157 also include one or more NLP models 163 that are executable by the processor(s) 156 to enable a computing device (e.g., the processor(s) 119 of the vehicle 110, the portable computing device 150, or the remote computing device(s) 130) to perform various operations based on unstructured, natural language content (such as the speech input 101 or text representing the speech input 101). The speech-to-text engine 162, the NLP model(s) 163, or both, may include or correspond to one or more trained machine-learning models.

In the example illustrated in FIG. 1, the memory device(s) 157 also include access control instructions 164. The access control instructions 164 are executable by the processor(s) 156 to control access to particular functions of the portable computing device 150. For example, the access control instructions 164 may be executable to determine whether a user that uttered the speech input 101 is authorized to provide navigation commands (e.g., the navigation command 102) to the vehicle 110 or to the portable computing device 150. In this example, if the user is authorized to provide navigation commands, the navigation command 102 may cause navigation instructions 165 of the portable computing device 150 or to the navigation instructions 115 of the vehicle 110 to perform specified actions; however, if the user is not authorized to provide navigation commands, the navigation command 102 may be rejected (e.g., discarded).

In the example illustrated in FIG. 1, the memory device(s) 157 also include the navigation instructions 165. The navigation instructions 165 are executable by the processor(s) 156 to generate navigation data, such as the route(s) 117 and/or the navigation waypoint(s) 118. For example, the navigation instructions 165 may designate a current location of the portable computing device 150, as indicated by location sensor(s) 155, as a starting navigation waypoint for a route. In this example, another of the navigation waypoint(s) 118 may be selected based on a location associated with an image that matches the description of the photograph 103. Additionally, or alternatively, the navigation instructions 165 may be executable by the processor(s) 156 to provide location data 159 indicating the current location of the portable computing device 150, the navigation waypoint(s) 118, the route(s) 117, navigation commands based on the route(s) 117, or a combination thereof, to the vehicle 110.

In the example illustrated in FIG. 1, the memory device(s) 157 also include a search engine 158. The search engine 158 includes or corresponds to instructions that are executable by the processor(s) 156 to search one or more data repositories based on query data. The one or more data repositories may include data stored at the memory device(s) 111 of the vehicle 110, the memory device(s) 157 of the portable computing device 150, one or more memory devices 133 of the remote computing device(s) 130, or a combination thereof. In a particular implementation, the search engine 158 is configured to search image data 160 based on the description of the photograph 103. As one illustrative example, the speech-to-text engine 162 may generate text representing the speech input 101, and the NLP model(s) 163 may process the text to identify a portion of the text that represents the navigation command 102 and a portion of the text that represents the description of the photograph 103. In this example, the portion of the text that represents the description of the photograph 103 may be provided to the search engine 158 to generate query data. The query data may be used to search the image data 160 (and optionally other image data that is not stored at the portable computing device 150) for one or more candidate images (e.g., images that the search engine 158 determines may match the query data).

In some implementations, the search engine 158 is configured to search for candidate image(s) as matches to the query data based at least in part on metadata 161 associated with the image data 160. As one example, in FIG. 1, the memory device(s) 157 include instructions corresponding to one or more object recognition models 167. In this example, the object recognition model(s) 167 are executable by the processor(s) 156 to generate tags identifying objects, people, places, landmarks, or other content of images of the image data 160. To illustrate, when the image data 160 includes an image that depicts a street view of a store front with a sign indicating the name of the store, objects in windows of the store, an entry door of the store, and features of a street in front of the store, the object recognition model(s) 167 may assign tags to many or all of these features of the image (and possibly other features as well). The tags may be stored as part of the metadata 161 associated with the image in the image data 160. In this illustrative example, the search engine 158 may search the image data 160 for tags that match (e.g., are within a threshold semantic similarity to) terms in the query data. In some implementations, the metadata 161 may also include other information associated with one or more of the images, such as a timestamp indicating when the image was captured and/or a geotag indicating a location at which the image was captured.

In some implementations, rather than (or in addition to) generating tags that are stored with the image data 160, the object recognition model(s) 167 may be used in real-time to analyze the images of the image data 160 to identify candidate images that include content that may match the query data. For example, the query data may be used to select or generate a reference image. To illustrate, terms of the query data may be provided as input to a generative model (such as the DALL-E 2 generative model) to generate a reference image. The reference image may be used with a few-shot learning model, which may identify candidate images of the image data 160 that are matches (e.g., within a selection threshold) to the reference image.

In some implementations, the search engine 158 may be configured to perform a search of the metadata 161 based on the query data (referred to herein as a "tag search") and to perform a search of the image data based on a reference image generated based on the query data (referred to herein as a "reference image search"). In such implementations, the tag search and the reference image search may be performed in parallel or sequentially. As an example of sequential searching, the reference image search may be performed if the tag search is not considered successful. In this example, the tag search may be considered unsuccessful if fewer than a threshold number of matching images are identified (e.g., fewer than 1, fewer than 3, fewer than 10, etc.). Alternatively, the tag search may be considered unsuccessful if no matching image is associated with at least a threshold match confidence value.

In particular implementations, one or more candidate images selected based on the tag search, the reference image search, or both, may be retrieved and depicted in a graphical user interface for display at the display device(s) 151 or at a display of the communication interface(s) 122 of the vehicle. In such implementations, a user may provide user input to confirm that a candidate image is a matching image or to deny that any of the candidate image(s) is a matching image. If the user input confirms that a particular candidate image is a matching image, location data associated with the matching image may be obtained and used to generate a navigation waypoint of the navigation waypoint(s) 118. If the user input denies that any of the candidate image(s) is a matching image, further search operations may be performed. For example, if the candidate image(s) were selected based on a tag search, the search engine 158 may perform a reference image search. In the same or another example, if the search engine 158 selected the candidate image(s) based on searching the image data 160 stored at the portable computing device 150, the portable computing device 150 may send query data to the remote computing device(s) 130 to initiate a search of image data 141. In the same or yet another example, the user may be prompted to provide additional description of the photograph and the query data may be updated based on the additional description.

In some implementations, the description of the photograph 103 may describe content of the photograph as well as other features, such as a general location at which the photograph was taken (e.g., the name of a city or a street, "next to Billy's school," etc.) or a description of a time when the photograph was taken (e.g., "at night," "last month," "on John's birthday," etc.). Descriptions of locations and times (or time ranges) may be compared to the metadata 161 to limit the search results. To illustrate, descriptions of locations may be used to filter the image data 160 based on geotag information in the metadata 161, and descriptions of times may be used to filter the image data based on timestamps in the metadata 161. For example, such descriptions may be used to filter the image data 160 based on the metadata 161 so that only images that satisfy such descriptions are searched. In some implementations, if no time or time range is specified, a default time range may be used. In such implementations, the default time range may be user configurable.

In the example illustrated in FIG. 1, the remote computing device(s) 130 include or correspond to personal computers, desktop computers, server computers, PDAs, laptop computers, communications devices, wireless telephones, smart phones, smart watches, headsets, or any similar computing device that includes one or more processors 132 configured to execute instructions from one or more memory devices 133. In a particular aspect, the remote computing device(s) 130 include one or more server computers of a cloud-based data storage system. In the same or different aspects, the portable computing device 150 is associated with a first user, and the remote computing device(s) 130 include similar devices associated with one or more other users. To illustrate, the portable computing device 150 may include a smart phone associated with the first user, and the remote computing device(s) 130 may include smart phone(s) associated with the one or more other users.

In the example illustrated in FIG. 1, the remote computing device(s) 130 include the memory device(s) 133, the processor(s) 132, and one or more communication interfaces 131. In other implementations, the remote computing device(s) 130 include more, fewer, or different components. For example, in some implementations, the remote computing device(s) 130 include a battery or other portable power supply to enable the remote computing device(s) 130 to operate without a connection to an external power source. As another example, in some implementations, the remote computing device(s) 130 include one or more display devices, one or more cameras, one or more microphones, one or more location sensors, etc.

The communication interface(s) 131 include one or more transceivers, one or more data ports, etc. For example, the communication interface(s) 131 may include wired or wireless network adaptors configured to support the one or more second network connections 191 between the portable computing device 150 and the remote computing device(s) 130. In some implementations, the communication interface(s) 131 also include wired or wireless network adaptors configured to support the one or more third network connections 192 between the website(s) 180 and the remote computing device(s) 130. In other implementations, the remote computing device(s) 130 host the website(s) 180, in which case the third network connections 192 are internal to the remote computing device(s) 130.

In the example illustrated in FIG. 1, the memory device(s) 133 store data and instructions that are executable by the processor(s) 132 to perform various operations and functions. For example, in FIG. 1, the memory device(s) 133 include a search engine 134, one or more NLP models 136, access control instructions 135, one or more object recognition models 137, and a speech-to-text engine 138. Additionally, in FIG. 1, the memory device(s) 133 include data associated with one or more user accounts 139, data associated with one or more public internet domains 140, the image data 141, metadata 142 associated with the image data 141, and a search index 143.

In a particular implementation, the speech-to-text engine 138 includes or corresponds to instructions that are executable by the processor(s) 132 to receive, from the portable computing device 150 or the vehicle 110, audio data corresponding to the speech input 101 and to generate text representing the speech input 101 based on the audio data. The speech-to-text engine 138 is operable to perform the same functions as described above with reference to the speech-to-text engine 162 of the portable computing device 150 and/or the speech-to-text engine 112 of the vehicle 110. In some implementations, one or more of the speech-to-text engines 112, 138, 162 are omitted. For example, the portable computing device 150 may receive the speech input 101 and may send audio data representing the speech input 101 to the vehicle 110 for conversion to text by the speech-to-text engine 112 of the vehicle 110 or may send the audio data representing the speech input 101 to the remote computing device(s) 130 for conversion to text by the speech-to-text engine 138 of the remote computing device(s) 130. As another example, a microphone of the vehicle 110 may receive the speech input 101 and may send audio data representing the speech input 101 to the portable computing device 150 for conversion to text by the speech-to-text engine 162 of the portable computing device 150 or may send the audio data representing the speech input 101 to the remote computing device(s) 130 for conversion to text by the speech-to-text engine 138 of the remote computing device(s) 130.

In a particular implementation, the NLP model(s) 136 include or correspond to instructions that are executable by the processor(s) 132 to process the text representing the speech input 101 to identify portions of the text that represent the navigation command 102 and portions of the text that represent the description of the photograph 103. The NLP model(s) 136 are operable to perform the same functions as described above with reference to NLP model(s) 163 of the portable computing device 150 and/or the NLP model(s) 113 of the vehicle 110. In some implementations, one or more of the NLP models 113, 136, 163 are omitted. For example, the speech-to-text engine 162 of the portable computing device 150 may be used to generate text that represents the speech input 101, and the portable computing device 150 may send the text to the vehicle 110 for parsing by the NLP model(s) 113 of the vehicle 110 or may send the text to the remote computing device(s) 130 for parsing by the NLP model(s) 136 of the remote computing device(s) 130. As another example, the speech-to-text engine 112 of the vehicle 110 may be used to generate text that represents the speech input 101, and the vehicle 110 may send the text to the portable computing device 150 for parsing by the NLP model(s) 163 of the portable computing device 150 or may send the text to the remote computing device(s) 130 for parsing by the NLP model(s) 136 of the remote computing device(s) 130.

In a particular implementation, the object recognition model(s) 137 include or correspond to instructions that are executable by the processor(s) 132 to identify portions of images of the image data 141. For example, the object recognition model(s) 137 may be configured to identify objects, people, places, landmarks, or other content of images of the image data 141. The object recognition model(s) 137 are operable to perform the same functions as described above with reference to the object recognition model(s) 167 of the portable computing device 150. In some implementations, one or the other of the object recognition models 137, 167 are omitted. For example, the portable computing device 150 may send the image data 160 to the remote computing device(s) 130 for object identification by the object recognition model(s) 137 of the remote computing device(s) 130.

In a particular implementation, the access control instructions 135 include or correspond to instructions that are executable by the processor(s) 132 to control access to particular functions or data of the remote computing device(s) 130. For example, the access control instructions 135 may be executable to determine whether a user that uttered the speech input 101 is authorized to access a user account of the user account(s) 139. In this example, the image data 141 may be associated with various user accounts of the user account(s) 139, and only authorized users associated with a particular user account may be allowed to search image data associated with the particular user account. As another example, the access control instructions 135 may be executable to determine whether the vehicle 110 or the portable computing device 150 is authorized to access particular data or functions of the remote computing device(s) 130.

In a particular implementation, the search engine 134 includes or corresponds to instructions that are executable by the processor(s) 132 to search one or more data repositories based on query data. The one or more data repositories may include data stored at the memory device(s) 111 of the vehicle 110, the memory device(s) 157 of the portable computing device 150, the one or more memory devices 133 of the remote computing device(s) 130, or a combination thereof. The search engine 134 is operable to perform the same functions as described above with reference to the search engine 158 of the portable computing device 150. In a particular implementation, the search engine 134 is configured to search the image data 141 based on the description of the photograph 103.

In some implementations, the search engine 134 is omitted, and the search engine 158 of the portable computing device 150 performs all of the search operations described herein. In other implementations, the search engine 158 is omitted, and the search engine 134 performs all of the search operations described herein. In still other implementations, the search engine 134 and the search engine 158 cooperate to perform the search operations described herein. For example, the search engine 158 may perform search operations related to the image data 160 stored at the memory device(s) 157 of the portable computing device 150, and the search engine 134 may perform search operations related to the image data 141 stored at the memory device(s) 133 of the remote computing device(s) 130.

In implementations in which both the search engine 134 and the search engine 158 perform search operations, the search operations of the search engine 134 and the search operations of the search engine 158 may be performed sequentially or in parallel. As an example of sequential searching by the search engines 134, 158, the search engine 158 may perform an initial search of the image data 160 and may send query data to the remote computing device(s) 130 if the search of the image data 160 is not considered successful. In this example, the search of the image data 160 may be considered unsuccessful if fewer than a threshold number of candidate images are identified (e.g., fewer than 1, fewer than 3, fewer than 10, etc.) as potential matches for the query data, if no candidate image is associated with at least a threshold match confidence value, or if other search criteria are not satisfied. In this example, the search engine 134 performs a search of image data 141 responsive to the query data from the portable computing device 150.

In some implementations, the search engine 134 is also, or alternatively, configured to perform a search of content 181 associated with one or more publicly accessible websites 180. For example, the content 181 of the website(s) 180 may include images 182 and text 183, and the search engine 134 may search the images 182, the text 183, or both, based on the query data. In some such implementations, the website(s) 180 are associated with the public internet domain(s) 140. In some such implementations, the search engine 134 searches the content 181 of the website(s) 180 when no image of the image data 160 and/or no image of the image data 141 is considered a match to the description of the photograph 103. For example, the search engine 134 may search the content 181 of the website(s) 180 if fewer than a threshold number of candidate images are identified (e.g., fewer than 1, fewer than 3, fewer than 10, etc.) as potential matches for the query data, if no candidate image is associated with at least a threshold match confidence value, or if other search criteria are not satisfied, during a search of the image data 160 or during a search of the image data 141.

In a particular implementation, the search engine 134 is configured to search the content 181 of the website(s) 180 to determine information used to generate a waypoint based on a matching candidate image or to confirm that a candidate image is a matching image. In an example, after the search engine 158 identifies one or more candidate images, the search engine 158 may generate a search request based on at least one of the candidate image(s) and send the search request to the search engine 134. In this example, the search engine 134 operates as an internet search engine to search the content 181 of the website(s) 180 to generate second search results. The search engine 158, the search engine 134, or both, compare the speech input 101, the candidate image, or both, to the content 181 listed in the second search results to determine whether the candidate image is a matching image for the query data. To illustrate, if the description of the photograph 103 includes a reference to "the ice cream shop with the red door", the search engine 158 may identify a candidate image of the image data 160 that includes a storefront with a red door; however, it may not be discernable from the candidate image whether the storefront is an ice cream shop. In this illustrative example, the search engine 158 may generate a search request that includes, for example, the candidate image, text extracted from the candidate image (e.g., a name of the store), geotag information associated with the candidate image, etc., and may send the search request to the search engine 134. In this illustrative example, the search engine 134 searches the public internet domain(s) 140 associated with the website(s) 180 to identify the store and to extract content (e.g., the images 182, the text 183, or both), from a website associated with the store. The search engine 134, the search engine 158, or both, then compare the extracted content to the speech input 101 to determine whether the candidate image is a matching image. To illustrate, the search engine 158 may determine that the candidate image is a matching image if the text 183 associated with the website 180 of a store at the location associated with the geotag of the candidate image indicates that the store sells ice cream.

In some implementations, the search engine(s) 134, 158 may cooperate with respective NLP model(s) 136, 163 to determine whether the content 181 of a website 180 indicates that a candidate image is a matching image. For example, the text 183 of the website and text representing the speech input 101 may be provided as input to one or more of the NLP model(s) 136, 163 to generate a confidence metric based on semantic similarity of the input texts. The search engine(s) 134, 158 may determine whether a candidate image is a matching image based on the confidence metric.

Although the search engine 134 is described as searching the content 181 of the website(s) 180, in some implementations, this searching may be indirect. For example, the search index 143 may be generated by crawling the website(s) 180, and the search engine 134 may search the search index 143 rather than searching the website(s) 180 directly.

Figure 2:
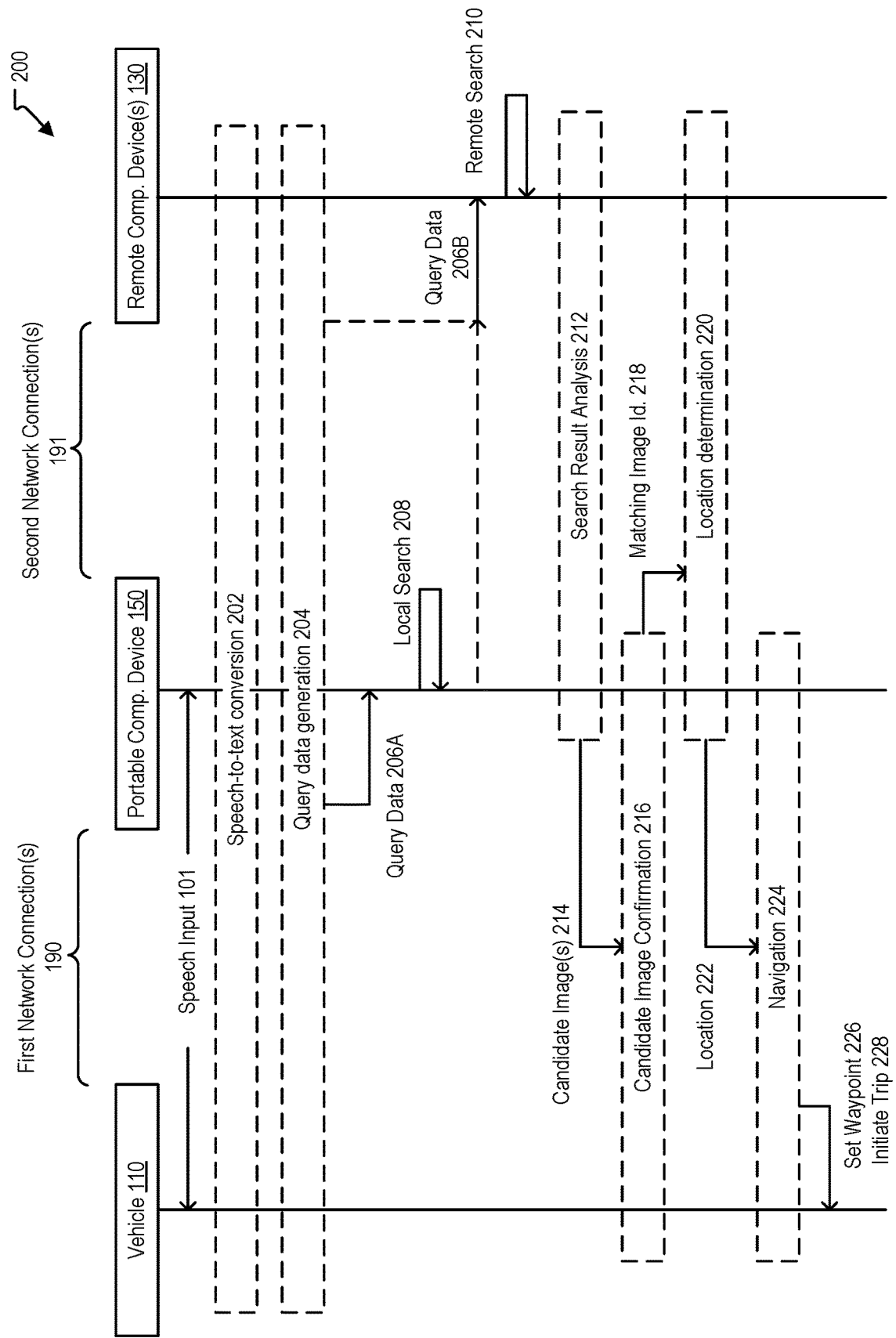
FIG. 2 is a diagram illustrating a non-limiting example of operations associated with image-based navigation that can be performed by the system of FIG. 1 in accordance with some examples of the present disclosure.

FIG. 2 is a diagram 200 illustrating a non-limiting example of operations associated with image-based navigation that can be performed by the system 100 of FIG. 1 in accordance with some examples of the present disclosure. FIG. 2 illustrates operations of the system 100 in a ladder diagram highlighting particular data exchange operations and other operations performed by the system 100. FIG. 2 illustrates the vehicle 110 communicatively coupled to the portable computing device 150 via the first network connection(s) 190 and the remote computing device(s) 130 communicatively coupled to the portable computing device 150 via the second network connection(s) 191.

In FIG. 2, the vehicle 110 or the portable computing device 150 receive the speech input 101. For example, the speech input 101 may be received by one or more microphones of the vehicle 110 or one or more microphones 153 of the portable computing device 150.

In FIG. 2, the vehicle 110, the portable computing device 150, the remote computing device(s) 130, or a combination thereof, perform speech-to-text conversion operations 202 to generate text representative of the speech input 101. For example, in a particular implementation, the vehicle 110 receives the speech input 101, and the speech-to-text engine 112 of the vehicle 110 generates text representative of the speech input 101. As another example, in a particular implementation, the vehicle 110 receives the speech input 101, and the vehicle 110 transmits audio data corresponding the speech input 101 to the portable computing device 150. In this example, the speech-to-text engine 162 of the portable computing device 150 may generate the text representative of the speech input 101. Alternatively, in this example, the portable computing device 150 may transmit the audio data corresponding the speech input 101 to the remote computing device(s) 130, in which case, the speech-to-text engine 138 of the remote computing device(s) 130 generates the text representative of the speech input 101.

As yet another example, in a particular implementation, the portable computing device 150 receives the speech input 101, and the speech-to-text engine 162 of the portable computing device 150 generates the text representative of the speech input 101. As still another example, in a particular implementation, the portable computing device 150 receives the speech input 101, and the portable computing device 150 transmits audio data corresponding to the speech input 101 to the remote computing device(s) 130, in which case, the speech-to-text engine 138 of the remote computing device(s) 130 generates the text representative of the speech input 101. As still a further example, in a particular implementation, the portable computing device 150 receives the speech input 101, and the portable computing device 150 transmits audio data corresponding the speech input 101 to the vehicle 110, in which case, the speech-to-text engine 112 of the vehicle 110 generates the text representative of the speech input 101.

In FIG. 2, the vehicle 110, the portable computing device 150, the remote computing device(s) 130, or a combination thereof, perform query data generation operations 204 to generate query data 206 based on the text representative of the speech input 101. For example, in a particular implementation, the NLP model(s) 113 generate the query data 206 based on text generated by the speech-to-text engine 112 of the vehicle 110 or based on text received from the portable computing device 150. As another example, in a particular implementation, the NLP model(s) 163 generate the query data 206 based on text generated by the speech-to-text engine 162 of the portable computing device 150, based on text received from the vehicle 110, or based on text received from the remote computing device(s) 130. As still another example, in a particular implementation, the NLP model(s) 136 generate the query data 206 based on text generated by the speech-to-text engine 138 of the remote computing device(s) 130, based on text generated by the vehicle 110, or based on text generated by the portable computing device 150.

The query data 206 is used to perform one or more searches. In FIG. 2, two examples of query data 206 are illustrated, including query data 206A and query data 206B. Either or both may be used to initiate a search. For example, the search engine 158 of the portable computing device 150 may perform a local search 208 based on the query data 206A. In this context, a local search refers to a search of the image data 160 and/or the metadata 161 stored at the portable computing device 150. Additionally, or alternatively, the portable computing device 150 may send the query data 206A to the remote computing device(s) 130 to cause the remote computing device(s) 130 to perform a remote search 210. As another example, the search engine 134 of the remote computing device(s) 130 may perform the remote search 210 without receiving the query data 206A from the portable computing device 150. For example, the NLP model(s) 136 of the remote computing device(s) 130 may generate the query data 206B, and the search engine 134 of the remote computing device(s) 130 may perform the remote search 210 based on the query data 206B. In some implementations, the remote search 210 may be performed based on results of the local search 208, in which case the portable computing device 150 may send the query data 206B to the remote computing device(s) 130 after performing the local search 208.

The local search 208, the remote search 210, or both, generate search results, and the portable computing device 150, the remote computing device(s) 130, or a combination thereof, perform search results analysis operations 212 to select one or more candidate images 214. In a particular implementation, the candidate image(s) 214 are selected images from among the image data 160, the image data 141, or both, that are determined to most closely match the description of the photograph 103 from the speech input 101. In a particular implementation, the search results may include a list identifying one or more images that at least partially match the description of the photograph 103 and at least partially satisfy any specified search criteria, such as a time range or location description. The search results may also include a match confidence value associated with each identified image, where the match confidence value indicates how well each image matches the description of the photograph 103. In some implementations, the match confidence value may also be based on how well each image satisfies any specified search criteria. The search results may be ordered and/or filtered based on the match criteria. For example, a user setting may indicate that at most a particular number of candidate image(s) 214 (e.g., one image, two images, five images, etc.) should be presented to a user for confirmation. In this example, up to the particular number of images identified in the search results are selected as candidate images based on the respective match confidence values of the images.

In FIG. 2, the vehicle 110, the portable computing device 150, or both, perform candidate image confirmation operations 216 based on the candidate images 214. For example, the candidate image(s) 214 may be displayed via a graphical user interface (GUI), which prompts a user to confirm or deny one or more of the candidate image(s) 214. As another example, the portable computing device 150 may generate query data based on the candidate image(s) 214 and send the query data to the remote computing device(s) 130 to search the content 181 of the one or more websites 180. In this example, search results from the search of the content 181 of the one or more websites 180 may be compared to the candidate image(s) 214 and/or to content of the speech input 101 to determine whether any of the candidate image(s) 214 is a matching image.

In FIG. 2, the portable computing device 150, the remote computing device 130, or both, perform location determination operations 220 to determine a location 222 associated with an image identified as a matching image (by matching image identifier 218). For example, if the matching image identifier 218 refers to an image of the image data 160, the processor(s) 156 may determine the location 222 based on a geotag associated with the image in the metadata 161. As another example, if the matching image identifier 218 refers to an image of the image data 141, the processor(s) 132 may determine the location 222 based on a geotag associated with the image in the metadata 142.

In FIG. 2, the vehicle 110, the portable computing device 150, or both, perform navigation operations 224 based on the location 222 associated with the matching image. For example, the navigation operations 224 may include setting a waypoint 226. To illustrate, the navigation instructions 115 may set one or more of the navigation waypoint(s) 118 based on the location 222. Alternatively, the navigation instructions 165 set one or more of the navigation waypoint(s) 118 based on the location 222. In some implementations, the navigation operations 224 may include initiating a trip 228. For example, the navigation instructions 115 may send navigation data 116 to the self-piloting control system 124 to initiate a trip to one or more of the navigation waypoint(s) 118.

In some implementations, the vehicle 110, the portable computing device 150, the remote computing device(s) 130, or a combination thereof, perform access control operations after receipt of the speech input 101 and before initiating the trip 228. As an example, the access control instructions 114 of the vehicle 110 may perform access control operations before the speech-to-text engine 112 of the vehicle 110 generates text representing the speech input 101, before the NLP model(s) 113 generate the query data 206, before the candidate image(s) 214 are presented for candidate image confirmation 216, before setting the waypoint 226, or a combination thereof. In this example, the access control instructions 114 of the vehicle 110 may determine whether the user that uttered the speech input 101 and/or the portable computing device 150 is authorized to perform any of the operations associated with image-based navigation.

As another example, the access control instructions 164 of the portable computing device 150 may perform access control operations before the speech-to-text engine 162 of the portable computing device 150 generates text representing the speech input 101, before the NLP model(s) 163 generate the query data 206, before performing the local search 208, before performing search result analysis 212, before the candidate image(s) 214 are presented for candidate image confirmation 216, before performing location determination 220 based on the matching image identifier 218, before sending the location 222 to the navigation instructions 115 or 165, before setting the waypoint 226, or a combination thereof. In this example, the access control instructions 164 of the portable computing device 150 may determine whether the user that uttered the speech input 101 and/or the vehicle 110 is authorized to perform any of the operations associated with image-based navigation.

As yet another example, the access control instructions 135 of the remote computing device(s) 130 may perform access control operations before the speech-to-text engine 138 of the remote computing device(s) 130 generates text representing the speech input 101, before the NLP model(s) 136 generate the query data 206, before performing the remote search 210, before performing search result analysis 212, before the candidate image(s) 214 are presented for candidate image confirmation 216, before performing location determination 220 based on the matching image identifier 218, before sending the location 222 to the navigation instructions 115 or 165, or a combination thereof. In this example, the access control instructions 135 of the remote computing device(s) 130 may determine whether the user that uttered the speech input 101, the vehicle 110, and/or the portable computing device 150 is authorized to perform any of the operations associated with image-based navigation. To illustrate, the access control instructions 135 may determine whether the user that uttered the speech input 101, the vehicle 110, and/or the portable computing device 150 is associated with a particular user account of the user account(s) 139.

Figure 3:
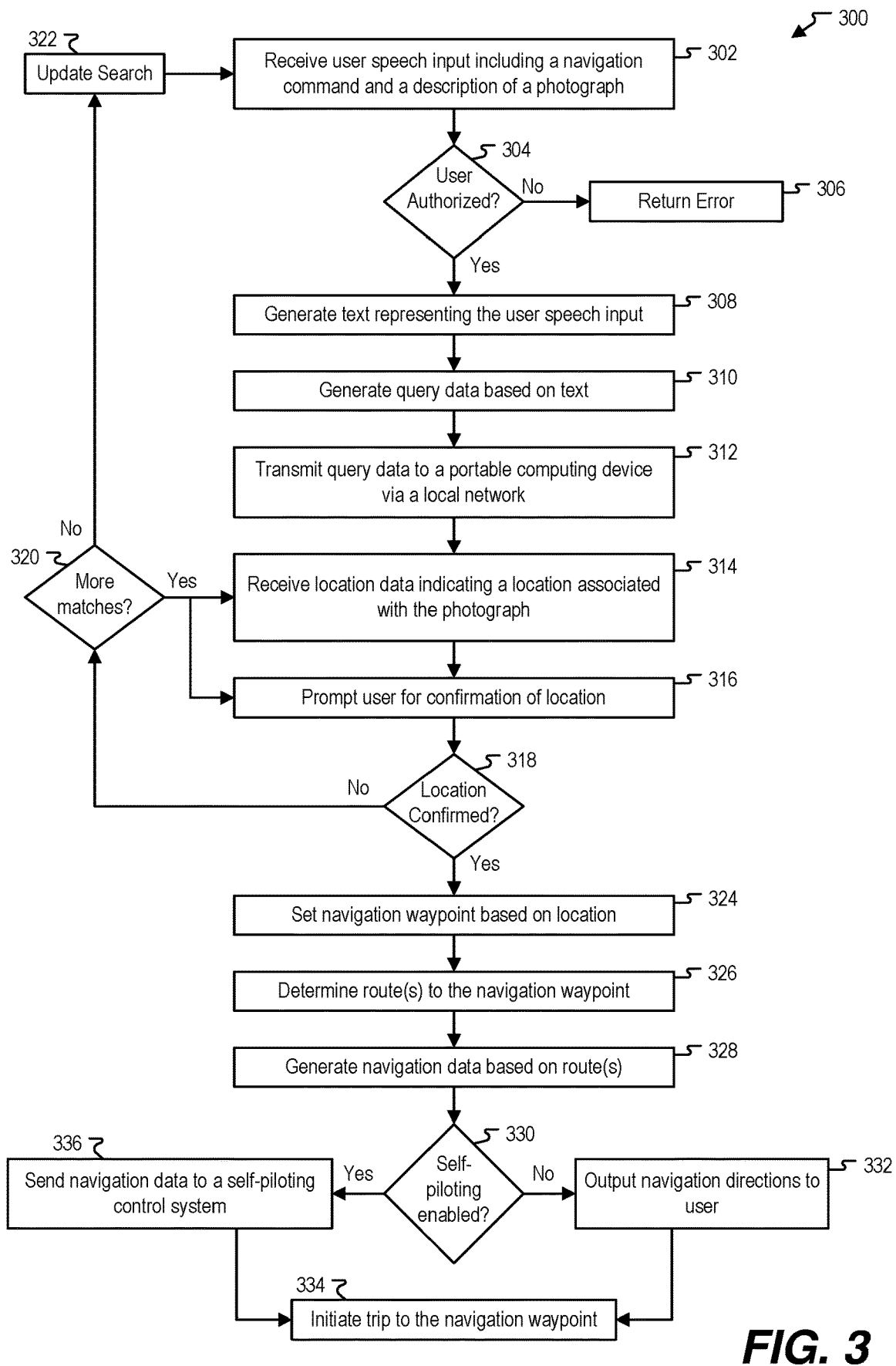
FIG. 3 is a flow chart of an example of a method of aspects of image-based navigation in accordance with some examples of the present disclosure.

FIG. 3 is a flow chart of an example of a method 300 of aspects of image-based navigation in accordance with some examples of the present disclosure. In a particular implementation, the method 300 may be initiated, performed, or controlled by the vehicle 110, the portable computing device 150, or the remote computing device(s) 130 of FIGS. 1 and 2.

In the example illustrated in FIG. 3, the method 300 includes, at block 302, receiving user speech input including a navigation command and a description of a photograph. For example, one or more microphones of the vehicle 110 may receive the speech input 101. As another example, the microphone(s) 153 of the portable computing device 150 may receive the speech input 101 and may send audio data representing the speech input 101 to the vehicle 110 via the first network connections 190. The speech input 101 includes the navigation command 102 indicating one or more navigation actions to be performed based on a location associated with an image that matches the description of the photograph 103.

In the example illustrated in FIG. 3, the method 300 includes, at block 304, determining whether the user that uttered the speech input 101 is authorized to perform various image-based navigation operations. For example, the access control instructions 114 may determine whether the user that uttered the speech input 101 is authorized to perform various image-based navigation operations. As another example, the vehicle 110 may send information to the portable computing device 150 or to the remote computing device(s) 130 and the respective access control instructions 164 or 135 may determine whether the user is authorized to perform particular image-based navigation operations. To illustrate, in a particular aspect, the access control instructions 135 of the remote computing device(s) 130 may determine whether the user that issued the speech input 101 is authorized to perform an image search, is authorized to access images associated with a particular user account, or both. If the user is not authorized, the method 300 includes, at block 306, returning an error message.

In the example illustrated in FIG. 3, the method 300 includes, at block 308, generating text based on the user speech input. For example, the speech-to-text engine 112 may generate the text based on the speech input 101. In some implementations, the speech input 101 is received at the vehicle 110, but another device performs the speech-to-text operations. For example, the speech input 101 may be received at the vehicle 110, and the vehicle 110 may transmit audio data corresponding to the speech input 101 to the portable computing device 150. In this example, the speech-to-text engine 162 of the portable computing device 150 may generate the text based on the audio data. Alternatively, in this example, the portable computing device 150 may transmit the audio data to the remote computing device(s) 130, and the speech-to-text engine 138 of the remote computing device(s) 130 may generate the text based on the audio data. The device that generates the text may perform further operations with the text (such as generating query data or performing a search), or the device that generates the text may send the text to another device to perform the further operations. To illustrate, the remote computing device(s) 130 may receive audio data from the portable computing device 150, generate text representing the audio data, and send the text to the portable computing device 150 for further processing. In this illustrative example, the portable computing device 150 may send the text to the vehicle 110, or perform further operations based on the text.

In the example illustrated in FIG. 3, the method 300 includes, at block 310, generating query data based on the text. For example, the NLP model(s) 113 may parse the text to generate the query data. In some implementations, one device generates the text, and another device uses the text to generate the query data. For example, the speech-to-text engine 112 of the vehicle 110 may generate the text, and the vehicle 110 may transmit the text to the portable computing device 150. In this example, the NLP model(s) 163 of the portable computing device 150 may generate the query data based on the text. Alternatively, in this example, the portable computing device 150 may transmit the text to the remote computing device(s) 130, and the NLP model(s) 136 of the remote computing device(s) 130 may generate the query data based on the text. The device that generates the query data may perform further operations with the query data (such as performing a search), or the device that generates the query data may send the query data to another device to perform the further operations.

In the example illustrated in FIG. 3, the method 300 includes, at block 312, transmitting the query data to the portable computing device 150 via a local network (e.g., the first network connection(s) 190). In this example, the search engine 158 of the portable computing device 150 performs a local search, based on the query data, to identify one or more candidate images. Additionally, or alternatively, the portable computing device 150 sends the query data to the remote computing device(s) 130, and the search engine 134 of the remote computing device(s) 130 performs a remote search, based on the query data, to identify one or more candidate images.

In the example illustrated in FIG. 3, the method 300 includes, at block 314, receiving location data indicating a location associated with the photograph. For example, the portable computing device 150, the remote computing device(s) 130, or both, may send location information indicating a location associated with an image that matches the description of photograph 103. The location associated with the photograph is determined by selecting from among the one or more candidate images, one or more matching images and determining a location associated with each of the one or more matching images. For example, geotag data associated with a particular matching image may be used as the location data.

In the example illustrated in FIG. 3, the method 300 includes, at block 316, prompting the user for confirmation of the location. For example, prompting the user may include outputting audio data describing the location and requesting user confirmation. To illustrate, one or more speakers of the vehicle 110 may output audio stating a name associated with the location or an address of the location determined based on the location data and asking the user for confirmation. In another example, the prompting the user may include outputting a GUI at a display of the vehicle 110 or at the display device(s) 151 of the portable computing device 150. In this example, the GUI may include the matching image, text describing the location, a map indicating the location, etc.

If the user fails to confirm the location at block 318, the method 300 may include, at block 320, determining whether more matching images have been identified. If more matching images have been identified, the method 300 may include, at block 314, receiving location data associated with at least one more matching image. Alternatively, if the location data associated with all matching images was previously received, the method 300 may include, at block 316, prompting the user to confirm at least one of the additional matching images. If there are no more matching images at block 320, the method 300 may include, at block 322, updating the search. For example, the user may be prompted to provide additional or different search criteria.

In the example illustrated in FIG. 3, if the user confirms the location at block 318, the method 300 includes, at block 324, setting a navigation waypoint based on the location. For example, the processor(s) 119 may execute the navigation instructions 115 to set one or more of the navigation waypoint(s) 118. Additionally, the method 300 may include, at block 326, determining one or more routes to the navigation waypoint. For example, the navigation instructions 115 may determine the route(s) 117 from a current location of the vehicle 110 indicated by the location sensor(s) 121 to the navigation waypoint(s) 118. The method 300 may further include, at block 328, generating navigation data based on the route(s). For example, the navigation instructions 115 may generate the navigation data 116 based on the navigation waypoint(s) 118, the route(s) 117, or both. In some implementations, the navigation data 116 includes information to assist a user with navigating along one of the route(s) 117, e.g., turn-by-turn instructions. In some implementations, the navigation data 116 includes information to cause the self-piloting control system 124 to follow one of the route(s) 117.

In the example illustrated in FIG. 3, the method 300 includes, at block 330, determining whether self-piloting is enabled. In this example, if self-piloting is not enabled, the method 300 includes, at block 332, outputting navigation directions (e.g., turn-by-turn navigation directions) to the user. To illustrate, one or more speakers of the vehicle 110, one or more displays of the vehicle 110, or both, may output information to assist the user with piloting the vehicle 110 along one of the route(s) 117. If self-piloting is enabled at block 330, the method 300 includes, at block 336, sending the navigation data to the self-piloting control system. The method 300 may also include, at block 334, initiating a trip to the navigation waypoint.

The operations illustrated in FIG. 3 are merely one example of image-based navigation operations that may be performed by the system 100. In other examples, the method 300 includes more, fewer, or different operations, or the operations are performed in a different order than illustrated in FIG. 3. To illustrate, in some implementations, determining whether the user is authorized (e.g., at block 304) is performed at a different point before the trip is initiated at block 334. As another example, in some implementations, a user may be prompted to confirm an image as a matching image rather than or in addition to the user being prompted to confirm the location, at block 316.

As another example, in some implementations, after the query data is transmitted at block 312, the method 300 may include searching image data stored at the memory device(s) 157 of the portable computing device 150 based on the description of the photograph 103. In this example, the method 300 may include obtaining data descriptive of one or more candidate images identified based on the image search and determining, for each of the one or more candidate images, a match confidence value. In this example, if no matching image (e.g., no candidate image with a sufficiently high match confidence value) is identified based on searching the memory device(s) 157 of the portable computing device 150, the search request may be sent to the remote computing device(s) 130 for further searching. Alternatively, search operations may be performed at the portable computing device 150 and the remote computing device(s) 130 in parallel.

As another example, in some implementations, after the query data is transmitted at block 312, the method 300 may include receiving first search results identifying candidate image(s), generating a search request based on at least one of the candidate image(s), and sending the search request to an internet search engine. In this example, second search results may be received from the internet search engine and the user speech input, the at least one candidate image, or both, may be compared to content associated with the second search results to determine whether the at least one candidate image is a matching image for the query data. To illustrate, text of a website included in the second search results and text associated with the user speech input may be compared, e.g., using the NLP model(s) 113, 163, or 136 to assign a confidence metric.

Figure 4:
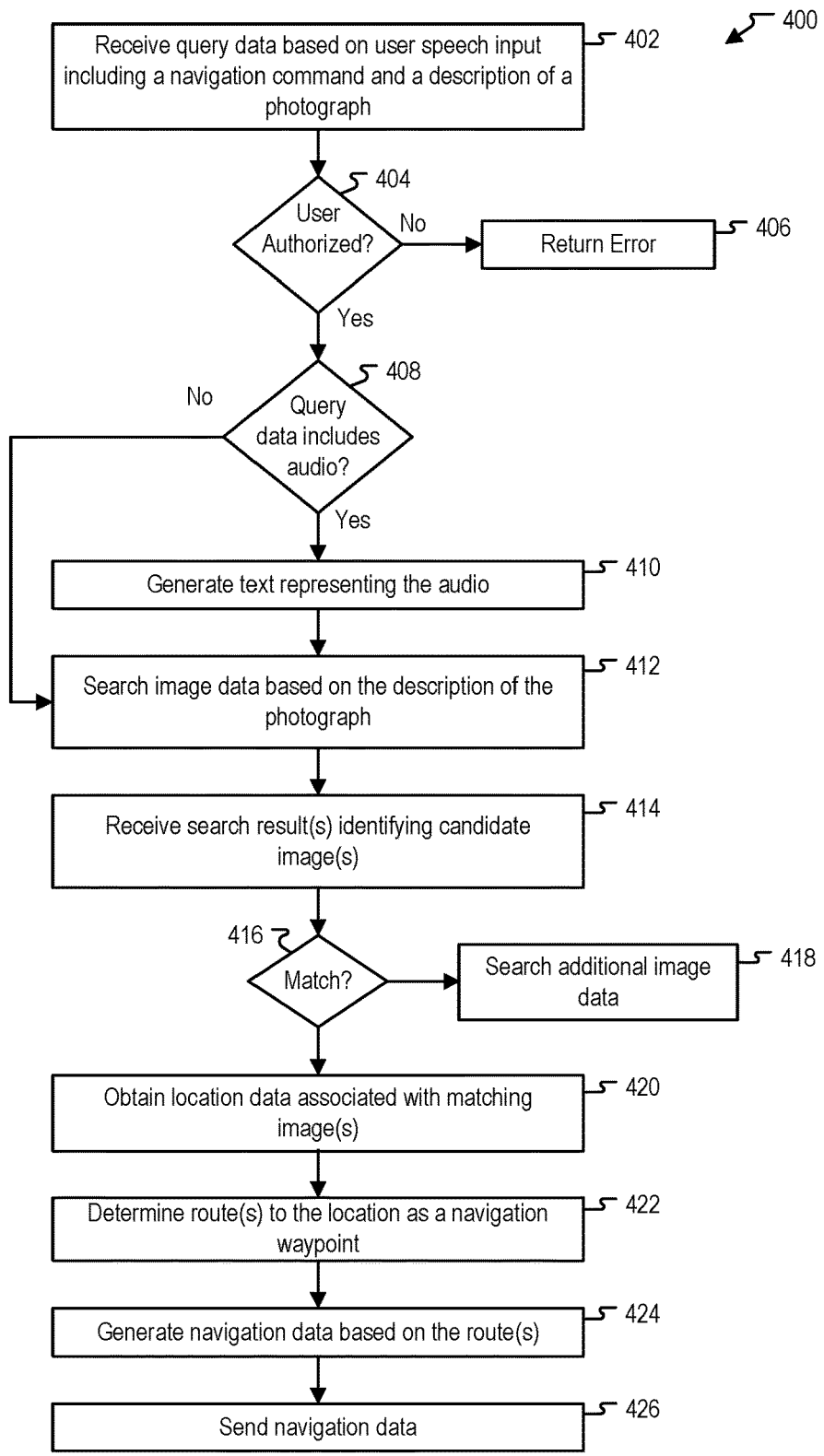
FIG. 4 is a flow chart of another example of a method of aspects of image-based navigation in accordance with some examples of the present disclosure.

FIG. 4 is a flow chart of another example of a method of aspects of image-based navigation in accordance with some examples of the present disclosure. In a particular implementation, the method 400 may be initiated, performed, or controlled by one or more of the vehicle 110, the portable computing device 150, or the remote computing device(s) 130 of FIGS. 1 and 2.

In the example illustrated in FIG. 4, the method 400 includes, at block 402, receiving query data based on user speech input including a navigation command and a description of a photograph. For example, one or more microphones of the vehicle 110 may receive the speech input 101 and send query data based on the speech input 101 to the portable computing device 150. As another example, the microphone(s) 153 of the portable computing device 150 may receive the speech input 101 and may generate the query data. As yet another example, the microphone(s) 153 of the portable computing device 150 may receive the speech input 101 and send query data based on the speech input 101 to the remote computing device(s) 130.

In the example illustrated in FIG. 4, the method 400 includes, at block 404, determining whether the user that uttered the speech input 101 is authorized to perform various image-based navigation operations. For example, the access control instructions 164 or 135 may determine whether the user that uttered the speech input 101 is authorized to perform various image-based navigation operations. If the user is not authorized, the method 400 includes, at block 406, returning an error message.

In the example illustrated in FIG. 4, the method 400 includes, at block 408, determining whether the query data includes audio. For example, in some implementations, the vehicle 110 receives the speech input 101 and sends audio data representing the speech input 101 to the portable computing device 150, in which case the query data would include audio. Alternatively, in some implementations, the vehicle 110 receives the speech input 101, generates text based on the audio data, and sends the text to the portable computing device 150, in which case the query data would not include audio. Similarly, when the portable computing device 150 receives the speech input 101, the portable computing device 150 may send audio data and/or text representing the speech input 101 to the remote computing device(s) 130.

If the query data includes audio at block 408, the method includes, at block 410, generating text representing the audio. For example, one or more of the speech-to-text engines 138, 162 may generate the text based on the speech input 101. Further, in some examples, one or more of the NLP model(s) 136, 163 may parse the text to identify in the text a description of a photograph 103.

In the example illustrated in FIG. 4, the method 400 includes, at block 412, searching image data based on the description of the photograph. For example, the search engine 158 may search the image data 160 stored at the memory device(s) 157 of the portable computing device 150 to determine whether any image of the image data 160 is a candidate image (e.g., an image that may match the description of the photograph 103). Additionally, or alternatively, the search engine 134 may search at least a portion of the image data 141 stored at the memory device(s) 133 of the remote computing device(s) 130. In some implementations, the memory device(s) 133 include image data 141 associated with multiple user accounts 139, and the search engine 134 searches only the portion of the image data 141 that is associated with a user account that the user who uttered the speech input 101 is authorized to access. In some implementations, the memory device(s) 133 include images 182 associated with website(s) 180 hosted at public internet domain(s) 140, and the search engine 134 searches the images 182 of the website(s) 180.

In the example illustrated in FIG. 4, the method 400 includes, at block 414, receiving search result(s) identifying candidate image(s), and determining, at block 416, whether any candidate image is considered to be a matching image. For example, the search engine 134 or 158 may assign a match confidence value to each candidate image of the search results. In this example, any candidate image associated with a match confidence value that satisfies a threshold (e.g., a match confidence threshold) is considered a matching image. If no matching image is identified at block 416, the method 400 may include, at block 418, searching additional image data. For example, if the search engine 158 does not identify a matching image among the image data 160, the portable computing device 150 may send query data to the remote computing device(s) 130 to cause the remote computing device(s) 130 to search the image data 141. As another example, if the search engine 134 does not identify a matching image among the image data 141, the search engine 134 may search the content 181 of the website(s) 180.

If one or more matching images are identified at block 416, the method 400 may include, at block 420, obtaining location data indicating a location associated with the matching image(s). For example, the location data may be determined based on geotag information in the metadata 161, 142 associated with the matching image(s).

In the example illustrated in FIG. 4, the method 400 includes, at block 422, determining one or more routes to the location as a navigation waypoint. For example, the navigation instructions 165 may determine the route(s) 117 from a current location of the portable computing device 150 indicated by the location sensor(s) 155 to a navigation waypoint(s) 118 set based on the location of a matching image. The method 400 may further include, at block 424, generating navigation data based on the route(s). For example, the navigation instructions 165 may generate the navigation data 116 based on the navigation waypoint(s) 118, the route(s) 117, or both. In some implementations, the navigation data 116 includes information to assist a user with navigating along one of the route(s), e.g., turn-by-turn instructions. In some implementations, the navigation data 116 includes information to cause the self-piloting control system 124 to follow one of the route(s) 117.

In the example illustrated in FIG. 4, the method 400 includes, at block 426, sending the navigation data 116 to the display device(s) 151 or to another device (e.g., the vehicle 110). For example, the navigation data 116 may be output to the user via a GUI presented at the display device(s) 151. As another example, the navigation data 116 may be sent to the vehicle 110 for presentation to the user, to guide the self-piloting control system 124, or both.

The operations illustrated in FIG. 4 are merely one example of image-based navigation operations that may be performed by the portable computing device 150 and/or the remote computing device(s) 130. In other examples, the method 400 includes more, fewer, or different operations, or the operations are performed in a different order than illustrated in FIG. 4. To illustrate, in some implementations, determining whether the user is authorized (e.g., at block 404) is performed at a different point before the navigation data is sent at block 426. As another example, in some implementations, a user may be prompted to confirm an image as a matching image at block 416.

As another example, in some implementations, after the location data is obtained, at block 420, the method 400 may include sending the location data to another device, such as the vehicle 110. In this example, the method 400 associated with the portable computing device 150 or the remote computing device(s) 130 ends, and other operations (e.g., determining route(s) and generating navigation data) are performed by the other device (e.g., the vehicle 110).

Figure 5:
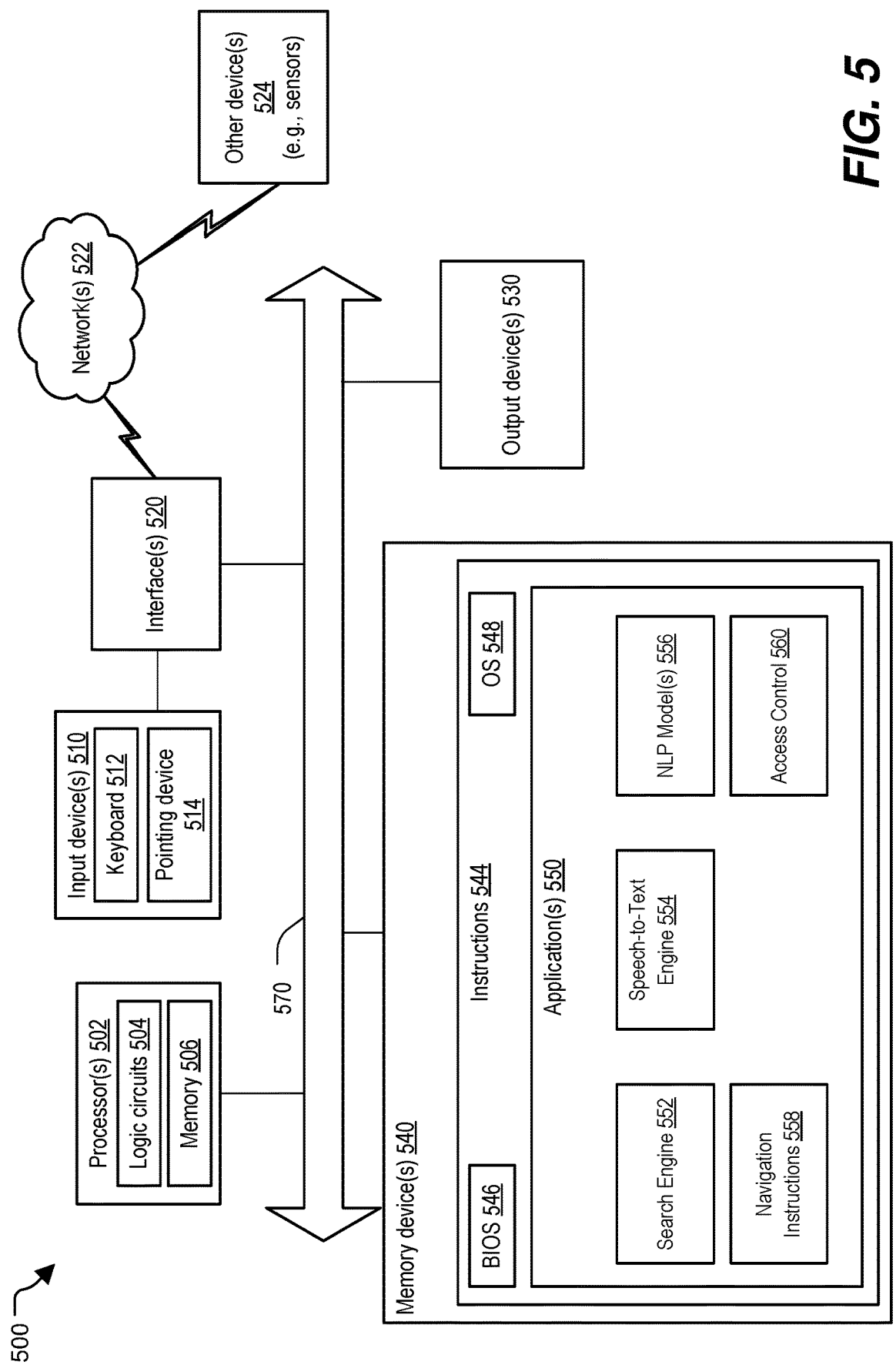
FIG. 5 is a block diagram illustrating a particular implementation of a computing device that is operable to perform

FIG. 5 is a block diagram illustrating a particular implementation of a computing device that is operable to perform aspects of image-based navigation in accordance with some examples of the present disclosure. For example, the computer system 500 is configured to initiate, perform, or control one or more of the operations described with reference to FIGS. 1-4. The computer system 500 can be implemented as or incorporated into one or more of various other devices, such as a personal computer (PC), a tablet PC, a server computer, a personal digital assistant (PDA), a laptop computer, a desktop computer, a communications device, a vehicle, a wireless telephone, or any other machine capable of executing a set of instructions (sequential or otherwise) that specify actions to be taken by that machine. Further, while a single computer system 500 is illustrated, the term "system" includes any collection of systems or sub-systems that individually or jointly execute a set, or multiple sets, of instructions to perform one or more computer functions.

While FIG. 5 illustrates one example of the computer system 500, other computer systems or computing architectures and configurations may be used for carrying out the image-based navigation operations disclosed herein. The computer system 500 includes one or more processors 502. The processor(s) 502 may include or correspond to the processor(s) 119, the processor(s) 132, or the processor(s) 156 of FIG. 1. Each processor of the processor(s) 502 can include a single processing core or multiple processing cores that operate sequentially, in parallel, or sequentially at times and in parallel at other times. Each processor of the processor(s) 502 includes circuitry defining a plurality of logic circuits 504, working memory 506 (e.g., registers and cache memory), communication circuits, etc., which together enable the processor(s) 502 to control the operations performed by the computer system 500 and enable the processor(s) 502 to generate a useful result based on analysis of particular data and execution of specific instructions.

The processor(s) 502 are configured to interact with other components or subsystems of the computer system 500 via a bus 570. The bus 570 is illustrative of any interconnection scheme serving to link the subsystems of the computer system 500, external subsystems or devices, or any combination thereof. The bus 570 includes a plurality of conductors to facilitate communication of electrical and/or electromagnetic signals between the components or subsystems of the computer system 500. Additionally, the bus 570 includes one or more bus controllers or other circuits (e.g., transmitters and receivers) that manage signaling via the plurality of conductors and that cause signals sent via the plurality of conductors to conform to particular communication protocols.

The computer system 500 also includes one or more memory devices 540. The memory device(s) 540 include, correspond to, or are included within the memory device(s) 111, the memory device(s) 133, or the memory device(s) 157 of FIG. 1. The memory device(s) 540 include any suitable computer-readable storage device depending on, for example, whether data access needs to be bi-directional or unidirectional, speed of data access required, memory capacity required, other factors related to data access, or any combination thereof. Generally, the memory device(s) 540 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc.

Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory device(s) 540 include circuits and structures and are not merely signals or other transitory phenomena (i.e., are non-transitory media).

In the example illustrated in FIG. 5, the memory device(s) 540 store instructions 544 that are executable by the processor(s) 502 to perform various operations and functions.

The instructions 544 include instructions to enable the various components and subsystems of the computer system 500 to operate, interact with one another, and interact with a user, such as a basic input/output system (BIOS) 546 and an operating system (OS) 548.

Additionally, the instructions 544 include one or more applications 550, scripts, or other program code to enable the processor(s) 502 to perform the operations described herein. For example, in FIG. 5, the instructions 544 include a search engine 552, a speech-to-text engine 554, one or more NLP models 556, navigation instructions 558, and access control instructions 560. In a particular aspect, the search engine 552 includes, corresponds to, or is included within one of the search engines 158 or 134 of FIG. 1. In a particular aspect, the speech-to-text engine 554 includes, corresponds to, or is included within one of the speech-to-text engines 112, 138, 162 of FIG. 1. In a particular aspect, the NLP model(s) 556 include, correspond to, or are included within one of the NLP model(s) 113, 136, 163 of FIG. 1. In a particular aspect, the navigation instructions 558 include, correspond to, or are included within one of the navigation instructions 115, 165 of FIG. 1. In a particular aspect, the access control instructions 560 include, correspond to, or are included within one of the access control instructions 114, 135, 164 of FIG. 1.

In FIG. 5, the computer system 500 also includes one or more output devices 530, one or more input devices 510, and one or more interface devices 520. In a particular aspect, the communication interface(s) 122, 154, or 131 include, are included within, or correspond to the output device(s) 530, the input device(s) 510, the interface devices 520, or a combination thereof. Each of the output device(s) 530, the input device(s) 510, and the interface device(s) 520 can be coupled to the bus 570 via a port or connector, such as a Universal Serial Bus port, a digital visual interface (DVI) port, a serial ATA (SATA) port, a small computer system interface (SCSI) port, a high-definition media interface (HDMI) port, or another serial or parallel port. In some implementations, one or more of the output device(s) 530, the input device(s) 510, and/or the interface device(s) 520 is coupled to or integrated within a housing with the processor(s) 502 and the memory device(s) 540, in which case the connections to the bus 570 can be internal, such as via an expansion slot or other card-to-card connector. In other implementations, the processor(s) 502 and the memory device(s) 540 are integrated within a housing that includes one or more external ports, and one or more of the output device(s) 530, the input device(s) 510, and/or the interface device(s) 520 is coupled to the bus 570 via the external port(s).

Examples of the output device(s) 530 include display device(s) (e.g., the display device(s) 151), speakers, printers, televisions, projectors, or other devices to provide output of data in a manner that is perceptible by a user. Examples of the input device(s) 510 include buttons, switches, knobs, a keyboard 512, a pointing device 514, a biometric device, a microphone, a motion sensor, or another device to detect user input actions. The pointing device 514 includes, for example, one or more of a mouse, a stylus, a track ball, a pen, a touch pad, a touch screen, a tablet, another device that is useful for interacting with a graphical user interface, or any combination thereof. A particular device may be an input device 510 and an output device 530. For example, the particular device may be a touch screen.

The interface device(s) 520 are configured to enable the computer system 500 to communicate with one or more other devices 524 directly or via one or more networks 522. For example, the interface device(s) 520 may encode data in electrical and/or electromagnetic signals that are transmitted to the other device(s) 524 as control signals or packet-based communication using pre-defined communication protocols. As another example, the interface device(s) 520 may receive and decode electrical and/or electromagnetic signals that are transmitted by the other device(s) 524. The electrical and/or electromagnetic signals can be transmitted wirelessly (e.g., via propagation through free space), via one or more wires, cables, optical fibers, or via a combination of wired and wireless transmission. The network(s) 522 may include or support the first network connection(s) 190, the second network connection(s) 191, and/or the third network connection(s) 192, of FIG. 1.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

The systems and methods illustrated herein may be described in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines, or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software, and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams, and flowchart illustrations of methods, apparatuses (e.g., systems), and computer media according to various aspects. It will be understood that each functional block of a block diagram and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Particular aspects of the disclosure are described below in the following Examples:

According to Example 1, a vehicle includes: one or more memory devices storing instructions; and one or more processors configured to execute the instructions to: receive user speech input, the user speech input including a navigation command and a description of a photograph; cause query data based on the user speech input to be transmitted via a local network to a portable computing device to initiate an image search based on the user speech input; receive, from the portable computing device via the local network, location data indicating a location associated with the photograph; and set a navigation waypoint based on the location data and based on the navigation command.

Example 2 includes the vehicle of Example 1, further including a self-piloting control system, wherein the one or more processors are further configured to, based on a determination that the navigation command specifies automated vehicle control, cause the self-piloting control system to initiate a trip to the navigation waypoint.

Example 3 includes the vehicle of Example 1 or Example 2, wherein the one or more processors are further configured to: determine one or more routes to the navigation waypoint; and generate navigation data based on the one or more routes.

Example 4 includes the vehicle of Example 3, further including a user interface, wherein the one or more processors are further configured to output, via the user interface, navigation instructions based on the navigation data and based on a current position of the vehicle.

Example 5 includes the vehicle of Example 3 or Example 4, further including a self-piloting control system, wherein the one or more processors are further configured to send the navigation data to the self-piloting control system.

Example 6 includes the vehicle of any of Examples 1 to 5, wherein the portable computing device is a smart phone within communication range of the local network.

Example 7 includes the vehicle of any of Examples 1 to 6, wherein the image search is performed responsive to determining that a user that issued the user speech input is authorized to perform the image search.

Example 8 includes the vehicle of any of Examples 1 to 7, wherein the local network includes a wireless peer-to-peer ad hoc network between a communication interface of the vehicle and a communication interface of the portable computing device.

Example 9 includes the vehicle of any of Examples 1 to 7, wherein the local network includes a wired connection between a communication interface of the vehicle and a communication interface of the portable computing device.

Example 10 includes the vehicle of any of Examples 1 to 9, wherein initiating the image search includes searching image data stored at one or more memory devices of the portable computing device based on the description of the photograph.

Example 11 includes the vehicle of Example 10, wherein initiating the image search further includes sending a search request, based on the description of the photograph, to one or more remote computing devices via a wireless wide area network.

Example 12 includes the vehicle of Example 11, wherein the one or more processors are further configured to: obtain data descriptive of one or more candidate images identified based on the image search of the image data stored at one or more memory devices of the portable computing device; determine, for each of the one or more candidate images, a match confidence value; and send the search request to the one or more remote computing devices based on the match confidence values.

Example 13 includes the vehicle of Example 11 or Example 12, wherein the one or more remote computing devices are associated with a cloud-based data storage system, wherein at least one of the vehicle, the portable computing device, or a user that issued the user speech input, is authorized to access a particular user account of the cloud-based data storage system, and wherein the search request causes the cloud-based data storage system to search image data associated with the particular user account.

Example 14 includes the vehicle of Example 11 or Example 12, wherein the one or more remote computing devices are associated with an internet search engine, and wherein the search request causes the internet search engine to search image data associated with one or more public internet domains.

Example 15 includes the vehicle of any of Examples 1 to 14, wherein the one or more processors are further configured to, after transmitting the query data to initiate the image search: receive first search results identifying one or more candidate images; generate a search request based on at least one candidate image of the one or more candidate images; send the search request to an internet search engine; receive second search results from the internet search engine; and compare the user speech input, the at least one candidate image, or both, to content associated with the second search results to determine whether the at least one candidate image is a matching image for the query data.

Example 16 includes the vehicle of Example 15, wherein the at least one candidate image is stored at one or more memory devices of the portable computing device.

Example 17 includes the vehicle of Example 15 or Example 16, wherein the at least one candidate image is stored at a cloud-based data storage system and associated with a particular user account of the cloud-based data storage system, and wherein at least one of the vehicle, the portable computing device, or a user that issued the user speech input, is authorized to access the particular user account of the cloud-based data storage system.

Example 18 includes the vehicle of any of Examples 15 to 17, wherein the content associated with the second search results includes text of a website identified in the second search results.

Example 19 includes the vehicle of Example 18, wherein comparing the user speech input, the at least one candidate image, or both, to the content associated with the second search results includes providing the text of the website and text associated with the user speech input, the at least one candidate image, or both, to one or more natural language processing models to assign a confidence metric.

Example 20 includes the vehicle of any of Examples 1 to 19, wherein the one or more processors are further configured to: obtain image data representing one or more images identified based on the image search; generate, based on the image data, a graphical user interface depicting the one or more images; and obtain user input to confirm at least one of the one or more images as a matching image, wherein the location data is associated with the matching image.

Example 21 includes the vehicle of Example 20, wherein the one or more processors are further configured to obtain the location data from geotag data associated with the matching image.

Example 22 includes the vehicle of any of Examples 1 to 21, wherein the one or more processors are further configured to generate text representing the user speech input, wherein the query data is based, at least in part, on the text.

Example 23 includes the vehicle of Example 22, wherein generating the text includes: causing audio data representing the user speech input to be sent to one or more remote computing devices to initiate speech-to-text conversion; and obtaining the text from the one or more remote computing devices in response to transmission of the audio data.

Example 24 includes the vehicle of Example 22 or Example 23, wherein the query data includes the text.

Example 25 includes the vehicle of Example 22, wherein the query data includes audio data representing the user speech input, wherein the portable computing device performs speech-to-text conversion to generate text based on the audio data, and wherein the image search is based on the text.

Example 26 includes the vehicle of any of Examples 1 to 25, wherein the description of the photograph includes a description of at least one of a person, an object, or a landmark depicted in the photograph.

Example 27 includes the vehicle of any of Examples 1 to 26, wherein the user speech input specifies a time range, and the image search is limited to images associated with timestamps within the time range.

Example 28 includes the vehicle of any of Examples 1 to 26, wherein the image search is limited to images associated with timestamps within a default time range.

Example 29 includes the vehicle of any of Examples 1 to 28, wherein the user speech input further includes one or more context descriptors, and the image search is based, in part, on the one or more context descriptors.

According to Example 30, a method includes: receiving user speech input at one or more processors of a vehicle, the user speech input including a navigation command and a description of a photograph; transmitting, via a local network, query data based on the user speech input to a portable computing device associated with the vehicle to initiate an image search based on the user speech input; receiving, at the one or more processors of the vehicle from the portable computing device via the local network, location data indicating a location associated with the photograph; and setting, by the one or more processors of the vehicle, a navigation waypoint based on the location data and based on the navigation command.

Example 31 includes the method of Example 30, further including, based on a determination that the navigation command specifies automated vehicle control, causing a self-piloting control system of the vehicle to initiate a trip to the navigation waypoint.

Example 32 includes the method of Example 30 or Example 31, further including: determining one or more routes to the navigation waypoint; and generating navigation data based on the one or more routes.

Example 33 includes the method of Example 32, further including outputting, via a user interface, navigation instructions based on the navigation data and based on a current position of the vehicle.

Example 34 includes the method of Example 32 or Example 33, further including sending the navigation data to a self-piloting control system of the vehicle.

Example 35 includes the method of any of Examples 30 to 34, wherein the portable computing device is a smart phone within communication range of the local network.

Example 36 includes the method of any of Examples 30 to 35, wherein the image search is performed responsive to determining that a user that issued the user speech input is authorized to perform the image search.

Example 37 includes the method of any of Examples 30 to 36, wherein the local network includes a wireless peer-to-peer ad hoc network between a communication interface of the vehicle and a communication interface of the portable computing device.

Example 38 includes the method of any of Examples 30 to 36, wherein the local network includes a wired connection between a communication interface of the vehicle and a communication interface of the portable computing device.

Example 39 includes the method of any of Examples 30 to 38, wherein initiating the image search includes searching image data stored at one or more memory devices of the portable computing device based on the description of the photograph.

Example 40 includes the method of Example 39, wherein initiating the image search further includes sending a search request, based on the description of the photograph, to one or more remote computing devices via a wireless wide area network.

Example 41 includes the method of Example 40, further including: obtaining data descriptive of one or more candidate images identified based on the image search of the image data stored at one or more memory devices of the portable computing device; determining, for each of the one or more candidate images, a match confidence value; and sending the search request to the one or more remote computing devices based on the match confidence values.

Example 42 includes the method of Example 40 or Example 41, wherein the one or more remote computing devices are associated with a cloud-based data storage system, wherein at least one of the vehicle, the portable computing device, or a user that issued the user speech input, is authorized to access a particular user account of the cloud-based data storage system, and wherein the search request causes the cloud-based data storage system to search image data associated with the particular user account.

Example 43 includes the method of Example 40 or Example 41, wherein the one or more remote computing devices are associated with an internet search engine, and wherein the search request causes the internet search engine to search image data associated with one or more public internet domains.

Example 44 includes the method of any of Examples 30 to 43, further including, after transmitting the query data to initiate the image search: receiving first search results identifying one or more candidate images; generating a search request based on at least one candidate image of the one or more candidate images; sending the search request to an internet search engine; receiving second search results from the internet search engine; and comparing the user speech input, the at least one candidate image, or both, to content associated with the second search results to determine whether the at least one candidate image is a matching image for the query data.

Example 45 includes the method of Example 44, wherein the at least one candidate image is stored at one or more memory devices of the portable computing device.

Example 46 includes the method of Example 44, wherein the at least one candidate image is stored at a cloud-based data storage system and associated with a particular user account of the cloud-based data storage system, and wherein at least one of the vehicle, the portable computing device, or a user that issued the user speech input, is authorized to access the particular user account of the cloud-based data storage system.

Example 47 includes the method of any of Examples 44 to 46, wherein the content associated with the second search results includes text of a website identified in the second search results.

Example 48 includes the method of Example 47, wherein comparing the user speech input, the at least one candidate image, or both, to the content associated with the second search results includes providing the text of the website and text associated with the user speech input, the at least one candidate image, or both, to one or more natural language processing models to assign a confidence metric.

Example 49 includes the method of any of Examples 30 to 48, further including: obtaining image data representing one or more images identified based on the image search; generating, based on the image data, a graphical user interface depicting the one or more images; and obtaining user input to confirm at least one of the one or more images as a matching image, wherein the location data is associated with the matching image.

Example 50 includes the method of Example 49, further including obtaining the location data from geotag data associated with the matching image.

Example 51 includes the method of any of Examples 30 to 50, further including generating text representing the user speech input, wherein the query data is based, at least in part, on the text.

Example 52 includes the method of Example 51, wherein generating the text includes: causing audio data representing the user speech input to be sent to one or more remote computing devices to initiate speech-to-text conversion; and obtaining the text from the one or more remote computing devices in response to transmission of the audio data.

Example 53 includes the method of Example 51 or Example 52, wherein the query data includes the text.

Example 54 includes the method of Example 51, wherein the query data includes audio data representing the user speech input, wherein the portable computing device performs speech-to-text conversion to generate text based on the audio data, and wherein the image search is based on the text.

Example 55 includes the method of any of Examples 30 to 54, wherein the description of the photograph includes a description of at least one of a person, an object, or a landmark depicted in the photograph.

Example 56 includes the method of any of Examples 30 to 55, wherein the user speech input specifies a time range, and the image search is limited to images associated with timestamps within the time range.

Example 57 includes the method of any of Examples 30 to 55, wherein the image search is limited to images associated with timestamps within a default time range.

Example 58 includes the method of any of Examples 30 to 57, wherein the user speech input further includes one or more context descriptors, and the image search is based, in part, on the one or more context descriptors.

According to Example 59, a non-transitory computer-readable device stores instructions that are executable by one or more processors to cause the one or more processors to: receive user speech input, the user speech input including a navigation command and a description of a photograph; transmit query data based on the user speech input to another computing device to initiate an image search based on the user speech input; receive, from the other computing device, location data indicating a location associated with the photograph; and set a navigation waypoint based on the location data and based on the navigation command.

Example 60 includes the non-transitory computer-readable device of Example 59, wherein the instructions are further executable to cause the one or more processors to, based on a determination that the navigation command specifies automated vehicle control, cause a self-piloting control system of a vehicle associated with the user speech input to initiate a trip to the navigation waypoint.

Example 61 includes the non-transitory computer-readable device of Example 59 or Example 60, wherein the instructions are further executable to cause the one or more processors to: determine one or more routes to the navigation waypoint; and generate navigation data based on the one or more routes.

Example 62 includes the non-transitory computer-readable device of Example 61, wherein the instructions are further executable to cause the one or more processors to output navigation instructions based on the navigation data and based on a current position of a vehicle associated with the user speech input.

Example 63 includes the non-transitory computer-readable device of Example 61 or Example 62, wherein the instructions are further executable to cause the one or more processors to send the navigation data to a self-piloting control system of a vehicle associated with the user speech input.

Example 64 includes the non-transitory computer-readable device of any of Examples 59 to 63, wherein the other computing device is a smart phone within communication range of a local network associated with a vehicle associated with the user speech input.

Example 65 includes the non-transitory computer-readable device of Example 64, wherein the local network includes a wireless peer-to-peer ad hoc network between a communication interface of the vehicle and a communication interface of the other computing device.

Example 66 includes the non-transitory computer-readable device of Example 64, wherein the local network includes a wired connection between a communication interface of the vehicle and a communication interface of the other computing device.

Example 67 includes the non-transitory computer-readable device of any of Examples 59 to 66, wherein the image search is performed responsive to determining that a user that issued the user speech input is authorized to perform the image search.

Example 68 includes the non-transitory computer-readable device of any of Examples 59 to 67, wherein initiating the image search includes searching image data stored at one or more memory devices of the other computing device based on the description of the photograph.

Example 69 includes the non-transitory computer-readable device of Example 68, wherein initiating the image search further includes sending a search request, based on the description of the photograph, to one or more remote computing devices via a wireless wide area network.

Example 70 includes the non-transitory computer-readable device of Example 69, wherein the instructions are further executable to cause the one or more processors to: obtain data descriptive of one or more candidate images identified based on the image search of the image data stored at one or more memory devices of the other computing device; determine, for each of the one or more candidate images, a match confidence value; and send the search request to the one or more remote computing devices based on the match confidence values.

Example 71 includes the non-transitory computer-readable device of Example 69 or Example 70, wherein the one or more remote computing devices are associated with a cloud-based data storage system, wherein at least one of a vehicle associated with the user speech input, the other computing device, or a user that issued the user speech input, is authorized to access a particular user account of the cloud-based data storage system, and wherein the search request causes the cloud-based data storage system to search image data associated with the particular user account.

Example 72 includes the non-transitory computer-readable device of Example 69 or Example 70, wherein the one or more remote computing devices are associated with an internet search engine, and wherein the search request causes the internet search engine to search image data associated with one or more public internet domains.

Example 73 includes the non-transitory computer-readable device of any of Examples 59 to 72, wherein the instructions are further executable to cause the one or more processors to, after transmitting the query data to initiate the image search: receive first search results identifying one or more candidate images; generate a search request based on at least one candidate image of the one or more candidate images; send the search request to an internet search engine; receive second search results from the internet search engine; and compare the user speech input, the at least one candidate image, or both, to content associated with the second search results to determine whether the at least one candidate image is a matching image for the query data.

Example 74 includes the non-transitory computer-readable device of Example 73, wherein the at least one candidate image is stored at one or more memory devices of the other computing device.

Example 75 includes the non-transitory computer-readable device of Example 73, wherein the at least one candidate image is stored at a cloud-based data storage system and associated with a particular user account of the cloud-based data storage system, and wherein at least one of a vehicle associated with the user speech input, the other computing device, or a user that issued the user speech input, is authorized to access the particular user account of the cloud-based data storage system.

Example 76 includes the non-transitory computer-readable device of any of Examples 73 to 75, wherein the content associated with the second search results includes text of a website identified in the second search results.

Example 77 includes the non-transitory computer-readable device of Example 76, wherein comparing the user speech input, the at least one candidate image, or both, to the content associated with the second search results includes providing the text of the website and text associated with the user speech input, the at least one candidate image, or both, to one or more natural language processing models to assign a confidence metric.

Example 78 includes the non-transitory computer-readable device of any of Examples 59 to 77, wherein the instructions are further executable to cause the one or more processors to: obtain image data representing one or more images identified based on the image search; generate, based on the image data, a graphical user interface depicting the one or more images; and obtain user input to confirm at least one of the one or more images as a matching image, wherein the location data is associated with the matching image.

Example 79 includes the non-transitory computer-readable device of Example 78, wherein the instructions are further executable to cause the one or more processors to obtain the location data from geotag data associated with the matching image.

Example 80 includes the non-transitory computer-readable device of any of Examples 59 to 79, wherein the instructions are further executable to cause the one or more processors to generate text representing the user speech input, wherein the query data is based, at least in part, on the text.

Example 81 includes the non-transitory computer-readable device of Example 80, wherein generating the text includes: causing audio data representing the user speech input to be sent to one or more remote computing devices to initiate speech-to-text conversion; and obtaining the text from the one or more remote computing devices in response to transmission of the audio data.

Example 82 includes the non-transitory computer-readable device of Example 80 or Example 81, wherein the query data includes the text.

Example 83 includes the non-transitory computer-readable device of Example 80, wherein the query data includes audio data representing the user speech input, wherein the other computing device performs speech-to-text conversion to generate text based on the audio data, and wherein the image search is based on the text.

Example 84 includes the non-transitory computer-readable device of any of Examples 59 to 83, wherein the description of the photograph includes a description of at least one of a person, an object, or a landmark depicted in the photograph.

Example 85 includes the non-transitory computer-readable device of any of Examples 59 to 84, wherein the user speech input specifies a time range, and the image search is limited to images associated with timestamps within the time range.

Example 86 includes the non-transitory computer-readable device of any of Examples 59 to 84, wherein the image search is limited to images associated with timestamps within a default time range.

Example 87 includes the non-transitory computer-readable device of any of Examples 59 to 86, wherein the user speech input further includes one or more context descriptors, and the image search is based, in part, on the one or more context descriptors.

According to Example 88, a computing device includes: one or more memory devices storing instructions; and one or more processors configured to execute the instructions to: receive, via a network, query data based on user speech input that includes a navigation command and a description of a photograph; initiate an image search based on the description of the photograph; determine, based on the image search, location data indicating a location associated with the photograph; and send, via the network, a navigation waypoint based on the location data and based on the navigation command.

Example 89 includes the computing device of Example 88, wherein the one or more processors are further configured to, based on a determination that the navigation command specifies automated vehicle control, cause a self-piloting control system of a vehicle to initiate a trip to the navigation waypoint.

Example 90 includes the computing device of Example 88 or Example 89, wherein the one or more processors are further configured to: determine one or more routes to the navigation waypoint; and generate navigation data based on the one or more routes.

Example 91 includes the computing device of Example 90, further including a user interface, wherein the one or more processors are further configured to output, via the user interface, navigation instructions based on the navigation data and based on a current position of a vehicle associated with the user speech input.

Example 92 includes the computing device of Example 90 or Example 91, wherein the one or more processors are further configured to send the navigation data to a self-piloting control system of a vehicle.

Example 93 includes the computing device of any of Examples 88 to 92, wherein the image search is performed responsive to determining that a user that issued the user speech input is authorized to perform the image search.

Example 94 includes the computing device of any of Examples 88 to 93, further including a communication interface of the computing device, wherein the network includes a wireless peer-to-peer ad hoc network between a communication interface of a vehicle and the communication interface of the computing device.

Example 95 includes the computing device of any of Examples 88 to 93, further including a communication interface of the computing device, wherein the network includes a wired connection between a communication interface of a vehicle and the communication interface of the computing device.

Example 96 includes the computing device of any of Examples 88 to 95, wherein initiating the image search includes searching image data stored at the one or more memory devices based on the description of the photograph.

Example 97 includes the computing device of Example 96, wherein initiating the image search further includes sending a search request, based on the description of the photograph, to one or more remote computing devices via a wireless wide area network.

Example 98 includes the computing device of Example 97, wherein the one or more processors are further configured to: obtain data descriptive of one or more candidate images identified based on the image search of the image data stored at the one or more memory devices; determine, for each of the one or more candidate images, a match confidence value; and send the search request to the one or more remote computing devices based on the match confidence values.

Example 99 includes the computing device of Example 97 or Example 98, wherein the one or more remote computing devices are associated with a cloud-based data storage system, wherein a user that issued the user speech input is authorized to access a particular user account of the cloud-based data storage system, and wherein the search request causes the cloud-based data storage system to search image data associated with the particular user account.

Example 100 includes the computing device of Example 97 or Example 98, wherein the one or more remote computing devices are associated with an internet search engine, and wherein the search request causes the internet search engine to search image data associated with one or more public internet domains.

Example 101 includes the computing device of any of Examples 88 to 100, wherein the one or more processors are further configured to, after initiating the image search: obtain first search results identifying one or more candidate images; generate a search request based on at least one candidate image of the one or more candidate images; send the search request to an internet search engine; receive second search results from the internet search engine; and compare the user speech input, the at least one candidate image, or both, to content associated with the second search results to determine whether the at least one candidate image is a matching image for the query data.

Example 102 includes the computing device of Example 101, wherein the at least one candidate image is stored at the one or more memory devices.

Example 103 includes the computing device of Example 101, wherein the at least one candidate image is stored at a cloud-based data storage system and associated with a particular user account of the cloud-based data storage system, and wherein a user that issued the user speech input is authorized to access the particular user account of the cloud-based data storage system.

Example 104 includes the computing device of any of Examples 101 to 103, wherein the content associated with the second search results includes text of a website identified in the second search results.

Example 105 includes the computing device of Example 104, wherein comparing the user speech input, the at least one candidate image, or both, to the content associated with the second search results includes providing the text of the website and text associated with the user speech input, the at least one candidate image, or both, to one or more natural language processing models to assign a confidence metric.

Example 106 includes the computing device of any of Examples 88 to 105, wherein the one or more processors are further configured to: obtain image data representing one or more images identified based on the image search; generate, based on the image data, a graphical user interface depicting the one or more images; and obtain user input to confirm at least one of the one or more images as a matching image, wherein the location data is associated with the matching image.

Example 107 includes the computing device of Example 106, wherein the one or more processors are further configured to obtain the location data from geotag data associated with the matching image.

Example 108 includes the computing device of any of Examples 88 to 107, wherein the one or more processors are further configured to generate text representing the user speech input, wherein the query data is based, at least in part, on the text.

Example 109 includes the computing device of Example 108, wherein generating the text includes: causing audio data representing the user speech input to be sent to one or more remote computing devices to initiate speech-to-text conversion; and obtaining the text from the one or more remote computing devices in response to transmission of the audio data.

Example 110 includes the computing device of Example 108 or 109, wherein the query data includes the text.

Example 111 includes the computing device of Example 108, wherein the query data includes audio data representing the user speech input, wherein the one or more processors are further configured to perform speech-to-text conversion to generate text based on the audio data, and wherein the image search is based on the text.

Example 112 includes the computing device of any of Examples 88 to 111, wherein the description of the photograph includes a description of at least one of a person, an object, or a landmark depicted in the photograph.

Example 113 includes the computing device of any of Examples 88 to 112, wherein the user speech input specifies a time range, and the image search is limited to images associated with timestamps within the time range.

Example 114 includes the computing device of any of Examples 88 to 113, wherein the image search is limited to images associated with timestamps within a default time range.

Example 115 includes the computing device of any of Examples 88 to 114, wherein the user speech input further includes one or more context descriptors, and the image search is based, in part, on the one or more context descriptors.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A vehicle comprising:
one or more memory devices storing instructions; and
one or more processors configured to execute the instructions to:
  receive user speech input, the user speech input including a navigation command and a description of a photograph;
  cause query data based on the user speech input to be transmitted via a local network to a portable computing device to initiate an image search based on the user speech input;
  receive, from the portable computing device via the local network, location data indicating a location associated with the photograph; and
  set a navigation waypoint based on the location data and based on the navigation command.

2. The vehicle of claim 1, wherein the one or more processors are further configured to:
determine one or more routes to the navigation waypoint; and
generate navigation data based on the one or more routes.

3. The vehicle of claim 1, wherein initiating the image search comprises searching image data stored at one or more memory devices of the portable computing device based on the description of the photograph.

4. The vehicle of claim 3, wherein the one or more processors are further configured to:
obtain data descriptive of one or more candidate images identified based on the image search of the image data stored at the one or more memory devices of the portable computing device;
determine, for each of the one or more candidate images, a match confidence value; and
send a search request to one or more remote computing devices based on the match confidence values.

5. The vehicle of claim 4, wherein the one or more remote computing devices are associated with a cloud-based data storage system, wherein at least one of the vehicle, the portable computing device, or a user that issued the user speech input, is authorized to access a particular user account of the cloud-based data storage system, and wherein the search request causes the cloud-based data storage system to search image data associated with the particular user account.

6. The vehicle of claim 1, wherein the one or more processors are further configured to, after transmitting the query data to initiate the image search:
receive first search results identifying one or more candidate images;
generate a search request based on at least one candidate image of the one or more candidate images;
send the search request to an internet search engine;
receive second search results from the internet search engine; and
compare the user speech input, the at least one candidate image, or both, to content associated with the second search results to determine whether the at least one candidate image is a matching image for the query data.

7. The vehicle of claim 6, wherein the at least one candidate image is stored at a cloud-based data storage system and associated with a particular user account of the cloud-based data storage system, and wherein at least one of the vehicle, the portable computing device, or a user that issued the user speech input, is authorized to access the particular user account of the cloud-based data storage system.

8. The vehicle of claim 6, wherein the content associated with the second search results includes text of a website identified in the second search results.

9. The vehicle of claim 8, wherein comparing the user speech input, the at least one candidate image, or both, to the content associated with the second search results includes providing the text of the website and text associated with the user speech input, the at least one candidate image, or both, to one or more natural language processing models to assign a confidence metric.

10. The vehicle of claim 1, wherein the one or more processors are further configured to:
obtain image data representing one or more images identified based on the image search;
generate, based on the image data, a graphical user interface depicting the one or more images; and
obtain user input to confirm at least one of the one or more images as a matching image, wherein the location data is associated with the matching image.

11. The vehicle of claim 10, wherein the one or more processors are further configured to obtain the location data from geotag data associated with the matching image.

12. The vehicle of claim 1, wherein the one or more processors are further configured to generate text representing the user speech input, wherein the query data is based, at least in part, on the text.

13. The vehicle of claim 12, wherein generating the text comprises:
causing audio data representing the user speech input to be sent to one or more remote computing devices to initiate speech-to-text conversion; and
obtaining the text from the one or more remote computing devices in response to transmission of the audio data.

14. The vehicle of claim 12, wherein the query data includes the text.

15. The vehicle of claim 12, wherein the query data includes audio data representing the user speech input, wherein the portable computing device performs speech-to-text conversion to generate text based on the audio data, and wherein the image search is based on the text.

16. A method comprising:
receiving user speech input at one or more processors of a vehicle, the user speech input including a navigation command and a description of a photograph;
transmitting, via a local network, query data based on the user speech input to a portable computing device associated with the vehicle to initiate an image search based on the user speech input;
receiving, at the one or more processors of the vehicle from the portable computing device via the local network, location data indicating a location associated with the photograph; and
setting, by the one or more processors of the vehicle, a navigation waypoint based on the location data and based on the navigation command.

17. The method of claim 16, further comprising, after transmitting the query data to initiate the image search:
receiving first search results identifying one or more candidate images;
generating a search request based on at least one candidate image of the one or more candidate images;
sending the search request to an internet search engine;
receiving second search results from the internet search engine; and
comparing the user speech input, the at least one candidate image, or both, to content associated with the second search results to determine whether the at least one candidate image is a matching image for the query data.

18. The method of claim 16, wherein the user speech input specifies a time range, and the image search is limited to images associated with timestamps within the time range.

19. The method of claim 16, wherein the user speech input further includes one or more context descriptors, and the image search is based, in part, on the one or more context descriptors.

20. A non-transitory computer-readable device storing instructions that are executable by one or more processors to cause the one or more processors to:
receive user speech input, the user speech input including a navigation command and a description of a photograph;
transmit query data based on the user speech input to another computing device to initiate an image search based on the user speech input;
receive, from the other computing device, location data indicating a location associated with the photograph; and
set a navigation waypoint based on the location data and based on the navigation command.

* * * * *